US010039027B2

(12) United States Patent
Huang

(10) Patent No.: US 10,039,027 B2
(45) Date of Patent: Jul. 31, 2018

(54) TRANSMISSION OF MACHINE TYPE COMMUNICATIONS DATA USING DISRUPTED CONNECTIVITY

(71) Applicant: HUAWEI TECHNOLOGIES CO., LTD., Shenzhen (CN)

(72) Inventor: Yangcheng Huang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 111 days.

(21) Appl. No.: 15/151,841

(22) Filed: May 11, 2016

(65) Prior Publication Data
US 2016/0255532 A1 Sep. 1, 2016

Related U.S. Application Data

(63) Continuation of application No. PCT/EP2013/073730, filed on Nov. 13, 2013.

(51) Int. Cl.
H04W 28/02 (2009.01)
H04W 28/14 (2009.01)
H04W 4/00 (2018.01)
H04W 76/02 (2009.01)
H04W 28/12 (2009.01)
(Continued)

(52) U.S. Cl.
CPC ....... H04W 28/0215 (2013.01); H04W 4/005 (2013.01); H04W 4/006 (2013.01); H04W 4/38 (2018.02); H04W 4/70 (2018.02); H04W 28/14 (2013.01); H04W 76/02 (2013.01); H04W 76/10 (2018.02)

(58) Field of Classification Search
CPC ....... H04W 4/00; H04W 4/005; H04W 4/006; H04W 28/02; H04W 28/0215; H04W 28/12; H04W 28/14; H04W 76/02; H04W 4/38; H04W 4/70; H04W 76/10
See application file for complete search history.

(56) References Cited

U.S. PATENT DOCUMENTS 8,902,914 B2 * 12/2014 Zakrzewski ...... H04W 52/0261
370/311
8,913,589 B2 * 12/2014 Zhang .................. H04L 47/808
370/331

(Continued)

FOREIGN PATENT DOCUMENTS

EP 1 771 023 A1 4/2007
WO 2011/098992 A1 8/2011
(Continued)

OTHER PUBLICATIONS

International Search Report and Written Opinion dated Aug. 13, 2014 in corresponding International Patent Application No. PCT/EP2013/073730.
(Continued)

Primary Examiner — Tri H Phan
(74) Attorney, Agent, or Firm — Staas & Halsey LLP

(57) ABSTRACT

The invention relates to methods for controlling transmission of machine type communications data to or from machine type communications devices within a mobile communication system. Furthermore, the invention relates to a network component and a network node for implementing such methods, and to implementations of the methods in software.

20 Claims, 16 Drawing Sheets

(51) Int. Cl.
*H04W 4/70* (2018.01)
*H04W 76/10* (2018.01)
*H04W 4/38* (2018.01)

(56) References Cited

U.S. PATENT DOCUMENTS

| | | | | |
|---|---|---|---|---|
| 9,036,532 | B2* | 5/2015 | Lim | H04W 4/08 |
| | | | | 370/312 |
| 9,191,841 | B2* | 11/2015 | Zakrzewski | H04W 24/08 |
| 9,615,194 | B2* | 4/2017 | Zhang | H04W 4/005 |
| 9,750,066 | B2* | 8/2017 | Hossain | H04W 4/70 |
| 2008/0147867 | A1* | 6/2008 | Chan | H04L 12/2809 |
| | | | | 709/227 |
| 2009/0129316 | A1* | 5/2009 | Ramanathan | H04L 45/123 |
| | | | | 370/328 |
| 2013/0015953 | A1* | 1/2013 | Hsu | H04W 4/005 |
| | | | | 340/7.46 |
| 2013/0128733 | A1* | 5/2013 | Lee | H04W 74/02 |
| | | | | 370/230 |
| 2013/0163495 | A1 | 6/2013 | Lim et al. | |
| 2013/0201823 | A1 | 8/2013 | Gupta | |
| 2013/0321347 | A1 | 12/2013 | Kim | |
| 2013/0324141 | A1* | 12/2013 | Jung | H04W 4/005 |
| | | | | 455/450 |
| 2014/0064232 | A1* | 3/2014 | Chang | H04W 48/18 |
| | | | | 370/329 |
| 2014/0286256 | A1* | 9/2014 | Chowdhury | H04L 47/56 |
| | | | | 370/329 |
| 2016/0255458 | A1* | 9/2016 | Huang | H04W 4/005 |
| | | | | 370/338 |

FOREIGN PATENT DOCUMENTS

| | | |
|---|---|---|
| WO | 2012/022966 A1 | 2/2012 |
| WO | 2485236 A | 5/2012 |
| WO | 2012/111993 A2 | 8/2012 |
| WO | 2012/111998 A2 | 8/2012 |

OTHER PUBLICATIONS

Cheng et al., "Overload Control for Machine-Type-Communications in LTE-Advanced System", LTE-Advanced and 4G Wireless Communications: Part 2, IEEE Communications Magazine, Jun. 2012, pp. 38-45.

Larmo et al., "RAN overload control for Machine Type Communications in LTE", GC'12 Workshop: Second International Workshop on Machine-to-Machine Communications 'Key' to the Future Internet of Things, IEEE, 2012, pp. 1626-1631.

Lioumpas et al., "Uplink Scheduling for Machine-to-Machine Communications in LTE-based Cellular Systems", pp. 1-5.

"Machine- to-Machine communications (M2M); Functional architecture", Draft ETSI TS 102 690 V0.12.3, ETSI, France, Jun. 2011, pp. 1-268.

Rao et al., "3GPP Enhancements for Machine Type Communications Overview", IEEE WoWMoM 2012 Panel, Qualcomm, 2012, pp. 1-15.

Shafiq et al., "A First Look at Cellular Machine-to-Machine Traffic-Large Scale Measurement and Characterization", SIGMETRICS'12, ACM, Jun. 11-15, 2016, London, England, pp. 1-12.

3rd Generation Partnership Project; Technical Specification Group Services and System Aspects; System improvements for Machine-Type Communications (MTC) (Release 11), 3GPP TR 23.888 V11.0.0, 3GPP Partnership Project, Valbonne, France, Sep. 2012, pp. 1-165.

"3rd Generation Partnership Project; Technical Specification Group Radio Access Network; Study on RAN Improvements for Machine-type Communications; (Release 11)", 3GPP TR 37.868 V11.0.0, 3GPP Partnership Project, Valbonne, France, Sep. 2011, pp. 1-28.

"3rd Generation Partnership Project; Technical Specification Group Services and System Aspects; Machine-Type and other mobile data applications Communications enhancements (Release 12)", 3GPP TR 23.887 V1.3.0, 3GPP Partnership Project, Valbonne, France, Nov. 2013, pp. 1-153.

"3rd Generation Partnership Project; Technical Specification Group GSM/EDGE Radio Access Network; GERAN improvements for Machine-Type Communications (MTC) (Release 12)", 3GPP TR 43.868 V12.0.0, 3GPP Partnership Project, Valbonne, France, Nov. 2012, pp. 1-16.

"3rd Generation Partnership Project; Technical Specification Group Radio Access; Radio Resource Control (RRC); Protocol specification (Release 10)", 3GPP TS 25.331 V10.13.0, 3GPP Partnership Project, Valbonne, France, Sep. 2013, pp. 1-9.

"3rd Generation Partnership Project; Technical Specification Group Services and System Aspects; General Packet Radio Service (GPRS) enhancements for Evolved Universal Terrestrial Radio Access Network (E-UTRAN) access (Release 12)", 3GPP TS 23.401 V12.2.0, 3GPP Partnership Project, Valbonne, France, Sep. 2013, pp. 1-1898.

International Search Report dated Aug. 13, 2014, in corresponding International Application No. PCT/EP2013/073730.

* cited by examiner

TRANSMISSION OF MACHINE TYPE COMMUNICATIONS DATA USING DISRUPTED CONNECTIVITY

CROSS-REFERENCE TO RELATED APPLICATION

This application is a continuation of International Application No. PCT/EP2013/073730, filed on Nov. 13, 2013, which is hereby incorporated by reference in its entirety.

FIELD OF INVENTION

The invention relates to methods for transmitting machine type communication data from machine type communications devices within a mobile communication system with disrupted connectivity. Furthermore, the invention relates to a mobile terminal and network node for implementing such methods, and to implementations of the methods in software.

TECHNICAL BACKGROUND

Long Term Evolution (LTE)

The $3^{rd}$ Generation Partnership Program (3GPP) standardized a new mobile communication system called Long Term Evolution (LTE). LTE has been designed to meet carrier needs for high speed data and media transport as well as high capacity voice support. The work item specification on Long-Term Evolution (LTE) called Evolved UMTS Terrestrial Radio Access (UTRA) and UMTS Terrestrial Radio Access Network (UTRAN) has been released as Release 8 (LTE Rel. 8).

The LTE system provides packet-based radio access and radio access networks with fully IP-based functionality at low latency and low costs. LTE specifies multiple transmission bandwidths to achieve flexible system deployment. In the downlink, Orthogonal Frequency Division Multiplexing (OFDM) based radio access is used, while single-carrier frequency division multiple access (SC-FDMA) based radio access was adopted in the uplink. Many key packet radio access techniques are employed including multiple-input multiple-output (MIMO) channel transmission techniques, and a highly efficient control signaling structure is achieved in LTE Rel. 8/9.

The frequency spectrum for IMT-Advanced (4G) was decided at the World Radio communication Conference 2007 (WRC-07). IMT-Advanced, which includes LTE-Advanced (also known as LTE-A or LTE Rel. 10), provides a global platform on which to build next generations of interactive mobile services that will provide faster data access, enhanced roaming capabilities, unified messaging and broadband multimedia. The specification of LTE-A introduced enhancements such as carrier aggregation, multi-antenna enhancements and relays (Relay Nodes). The 3GPP specification of LTE-A was finalized in March 2011 and supports peak data rates up to 3.5 GBit/s in the downlink and 1.5 Gbit/s in the uplink. Further, LTE-A introduces support of Self Organizing Networks (SON), Multimedia Broadcast/Multicast Service (MBMS) and Heterogenous Networks (HetNets). Other LTE-A enhancements to LTE include architecture improvements for Home (e)NodeBs (i.e. femtocells), local IP traffic offloading, optimizations for machine-to-machine communications (M2C or MTC), SRVCC enhancements, eMBMS enhancements, etc.

In December 2012, further improvements to LTE-A have been standardized in the 3GPP in LTE-A Rel. 11. With this at present latest release of LTE-A, features like Coordinated Multi-Point transmission/reception (CoMP), Inter-Cell Interference Coordination (ICIC) enhancements, Network Improvements for Machine-Type Communication (NIMTC), etc.

LTE Architecture

FIG. 1 exemplarily shows the architecture of LTE, which equally applies to LTE-A as well. FIG. 2 illustrates the E-UTRAN architecture in more detail. The E-UTRAN comprises the eNodeB (which can be also referred to as a base station). The eNode B provides the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC), and Packet Data Control Protocol (PDCP) layers that include the functionality of user-plane header-compression and encryption. The eNodeB is also responsible for handling Radio Resource Control (RRC) functionality corresponding to the control plane and also implements several additional management functions including radio resource management, admission control, scheduling, enforcement of negotiated uplink Quality of Service (QoS), cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (S-GW) by means of the S1-U. The S1 interface supports a many-to-many relation between MMEs/Serving Gateways and eNodeBs. The S-GW routes and forwards user data packets, while also acting as the mobility anchor for the user plane during inter-eNodeB handovers and as the anchor for mobility between LTE and other 3GPP technologies. The S-GW terminates the S4 interface and relays the traffic between 2G/3G systems (via SGSN) and the PDN GW (P-GW). For idle state UEs, the S-GW terminates the downlink data path and triggers paging when downlink data arrives for the UE. It manages and stores UE contexts, e.g. parameters of the IP bearer service, network internal routing information. It also performs replication of the user traffic in case of lawful interception.

The MME is the key control-node for the LTE access-network. It is responsible for idle mode UE tracking and paging procedure including retransmissions. It is involved in the bearer activation/deactivation process and is also responsible for choosing the S-GW for a UE at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to UEs. It checks the authorization of the UE to camp on the service provider's Public Land Mobile Network (PLMN) and enforces UE roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming UEs.

LTE-A Improvements for Machine Type Communications (MTC)

Machine Type Communications (MTC) refers to communications between machines (typically MTC applications running on a hardware and communicating with each other) through mobile communication networks or other types of networks. In the 3GPP context, a MTC device denotes a UE equipped for machine type communications (sometimes also referred to as MTC UE), which communicates with MTC Server(s) and/or other MTC device(s). A MTC server can be considered an entity, which communicates to MTC devices e.g. through a PLMN.

An example of MTC technology might be a set of devices that monitor traffic in a city and communicate the information to the city's traffic lights in order to regulate the flow of traffic. MTC could be for example used in telemetry, data collection, remote control, robotics, remote monitoring, status tracking, road traffic control, offsite diagnostics and maintenance, security systems, logistic services, fleet management, and telemedicine.

MTC is expanding rapidly and has the potential to generate significant revenues for mobile network operators. MTC Devices are expected to outnumber voice subscribers by at least two orders of magnitude. Some predictions are much higher. MTC can enable machines to communicate directly with one another. MTC communication has the potential to radically change the world around us and the way that people interact with machines.

Machine type communications are expected to be one of the most differentiating technologies and applications in (building) next-generation communications networks (i.e. 5G). In addition to ultra-high network speed and increased maximum throughput (as compared to 4G), 5G technologies are expected to provide efficient support of machine-type devices to enable the Internet of Things with potentially higher numbers of connected devices, as well as novel applications such as mission critical control or traffic safety, requiring reduced latency and enhanced reliability.

3GPP TR 37.868, "RAN Improvements for Machine-type Communications", Version 11.0.0 (available at http://www.3gpp.org) studied the traffic characteristics of different MTC applications with machine-type communications and define new traffic models based on these findings. In this context, radio enhancements for UTRAN and E-UTRAN to improve the support of machine-type communications were also studied.

FIG. 3 illustrates the roaming architecture for 3GPP Architecture for Machine-Type Communication for a so-called home routed scenario, as it is specified in 3GPP TR 23.888, "System improvements for Machine-Type Communications (MTC)", version 11.0.0, (available at http://www.3gpp.org). In a so called Direct Model, the MTC Application communicates with the UE for MTC directly as an over-the-top application on 3GPP network. In this model, as illustrated in FIG. 4, the signaling (control plane) of MTC applications running on UEs or MTC devices located in the E-UTRAN is interfaced by a MTC InterWorking Function (MTC-IWF) which typically resided in the Home-PLMN. As further shown in FIG. 5, the user plane traffic of carrying the MTC data is relayed through the P-GW (optionally via the MTC Server) to the target MTC application (or vice versa). The MTC application may be running on the MTC server or another device inside or outside the home PLMN. An MTC-IWF could be a standalone entity or a functional entity of another network element. The MTC-IWF hides the internal PLMN topology and relays or translates signaling protocols used over MTCsp towards the MTC Server to invoke specific functionality in the PLMN. In the Direct Model, the MTC data is transmitted through the 3GPP network.

The RAN improvements should enable or improve the usage of RAN resources efficiently, and/or reduce the complexity when a large number of machine-type communications devices possibly need to be served based on the existing features as much as possible. Meanwhile, minimize the changes of existing specifications and the impaction of Human-to-Human (H2H) terminals in order to keep the complexity related to M2M optimizations at a minimum level. An overview of MTC enhancement and other enhancement for mobile data applications at the 3GPP for LTE-A (Release 12) is provided in 3GPP 23.887, "Machine-Type and other mobile data applications Communications enhancements", version 1.3.0 (available at http://www.3gpp.org).

PDN Connectivity and MTC

Connectivity for MTC data transmission is based on packet data network (PDN) connectivity. In LTE-A, a PDN connection is an association between an UE and a PDN GW (P-GW). It is represented by one IPv4 address and/or one IPv6 prefix of the UE. As shown in FIG. 3, P-GW is the gateway for MTC data to and from the MTC Server or the UE. Generally, a UE may have simultaneous connectivity with more than one P-GW for accessing multiple packet data networks.

For E-UTRAN access to the EPC, the PDN connectivity service is provided by an EPS bearer between the UE and the P-GW for a GTP-based S5/S8 interface, and by an EPS bearer between UE and S-GW concatenated with IP connectivity between S-GW and P-GW for PMIP-based S5/S8. An EPS bearer uniquely identifies traffic flows that receive a common Quality of Service (QoS) treatment between a UE and a P-GW for GTP-based S5/S8 and between UE and S-GW for PMIP-based S5/S8. The packet filters signaled in the NAS procedures are associated with a unique packet filter identifier on per-PDN connection basis.

One EPS bearer is established when the UE connects to a PDN, and that remains established throughout the lifetime of the PDN connection to provide the UE with always-on IP connectivity to that PDN. That bearer is referred to as the default bearer. Any additional EPS bearer that is established for the same PDN connection is referred to as a dedicated bearer.

An UpLink Traffic Flow Template (UL TFT) is the set of uplink packet filters in a TFT. A DownLink Traffic Flow Template (DL TFT) is the set of downlink packet filters in a TFT. Every dedicated EPS bearer is associated with a TFT. A TFT may be also assigned to the default EPS bearer. The UE uses the UL TFT for mapping traffic to an EPS bearer in the uplink direction. The PCEF (for GTP-based S5/S8) or the BBERF (for PMIP-based S5/S8) uses the DL TFT for mapping traffic to an EPS bearer in the downlink direction.

As illustrated in FIG. 6, traffic flows are mapped onto the corresponding PDN connections using TFTs (Traffic Flow Templates).

PDN connectivity is established through the following procedures:
1. Establish the RRC connection between UE and eNodeB, using RRC connection establishment procedure;
2. If UE is in EMM-IDLE mode, the Service Request procedure is performed before the PDN Connectivity procedure can be initiated;
3. The PDN Connectivity Request procedure is initiated by UE towards MME;

4. PDN connection requests are rejected immediately if any request of the above procedures cannot be accepted by the network.

With the current concept of PDN connectivity, one PDN connection is exclusively used by a particular UE. Accordingly, as shown in FIG. 7, multiple MTC UEs will generate a plurality of different types of PDN connections.

MTC traffic typically exhibits significantly different characteristics from conventional mobile traffic initiated by subscribers, including:
1. Non-interactive: machine initiated traffic; non-real-time; delay tolerant (depending upon application requirements); potentially time-shift-able.
2. Short connectivity duration: sporadic connectivity (i.e. active for traffic for much less time than smart phones; occurring much less frequently).
3. High signaling overhead: disproportional amount of control plane overhead, compared to user plane traffic, for establishing and tearing down short sessions.
4. Dominant uplink traffic volume: much larger ratio of uplink to downlink traffic volume; requiring low latency in uplink; smaller packets in size.
5. Bursty traffic aggregate: synchronized traffic resulting in bursty aggregate signaling traffic/session volumes.
6. Predictable mobility: mobility depending upon types of MTC devices; more predictable mobility for the same type of MTC devices.

Existing radio access networks are mainly designed for continuous data traffics in the downlink, and optimized for high downlink data rate/volume, which in turn makes control signaling overhead manageable. Further, they are mainly designed for instantaneous communications for human initiated at-will connectivity requests, which have to be rejected immediately if network resources (at the time of receiving the requests) cannot satisfy the requests.

In comparison, MTC applications may be expected to be non-interactive, demanding more uplink capacity and introducing disproportional amount of control plane overhead (in establishing and tearing down short sessions). A large number of MTC devices is expected to be deployed in a specific area, thus the network may have to face increased load as well as possible surges of MTC traffic, especially the signaling traffic.

Network congestion including radio network congestion and signaling network congestion (at core nodes) may happen due to mass concurrent data and signaling transmission. This may significantly downgrade network performance and affect quality of experience of smart phone users, leading to dead connections, dropped calls, bad coverage, and intermittent data connectivity.

Mechanisms to guarantee network availability and help networks to meet performance requirements under such MTC load need to be further investigated. One promising way is to optimize protocols and system design of mobile access networks, based on characteristics of MTC traffic, in order to accommodate large volume of MTC devices in existing networks.

SUMMARY

One object of the invention is to suggest a mechanism allowing mitigation of one or more of the above noted potential problems with machine type communications in a mobile/wireless communication network.

A first aspect of the invention relates to the introduction of a disrupted-connectivity mode for the transmission of machine type communications data. When transmitting machine type communications data in disrupted-connectivity mode, a network node temporarily stores machine type communications data received from one or more downstream sources while the network load does not allow for forwarding the machine type communications data. When the network load changes and allows for forwarding the machine type communications data, the network node forwards the machine type communications data upstream towards the target device(s) to receive the machine type communications data. There may be one or more such network nodes in the transmission path of the machine type communications data. In disrupted-connectivity mode, the machine type communications data is transmitted together with a disrupted-connectivity header which indicates relevant parameters for the transmission of the machine type communications data, e.g. the maximum tolerable delay for transmission/forwarding of the machine type communications data.

Optionally, the network node may aggregate machine type communications data intended for reception by the same target device or machine type communications application, and may forward the aggregated machine type communications data to the target device or machine type communications application using one (and the same, single) connection. For example, and not limited to these options, the one connection could be a single bearer service or may be realized by repacking the aggregating machine type communications data in data packets destined to the target device or target machine type communications application.

Another second aspect of the invention relates to a signaling procedure between a mobile terminal intending to transmit machine type communications data and a network node, which allows the network node to configure a downstream source (e.g. a mobile terminal) to use disrupted-connectivity mode for transmitting machine type communications data. This signaling procedure allows a network node to configure a downstream source to enter disrupted-connectivity mode for example in cases where the network load upon receiving a connection request for the transmission of machine type communications data does not allow for forwarding machine type communications data upstream towards a target device or target machine type communications application.

The first and second aspect (and their different embodiments discussed herein) may be combined with one another.

In line with the first aspect, one embodiment thereof relates to a method for transmitting machine type communication data from at least one machine type communications device within a mobile communication system with disrupted connectivity. In this method, which is performed by a network node in the radio access network or in the core network of the mobile communication system, one or more data packets are received at the network node. Each data packet conveys machine type communications data and a disrupted-connectivity header. The disrupted-connectivity header indicates a maximum tolerable delay for forwarding the machine type communications data and an address of a target device to receive the respective machine type communications data. In one exemplary implementation, but not limited thereto, the disrupted-connectivity header encapsulates the machine type communications data.

The network nodes determines a load status of the mobile communication system, and if the load status indicates no overload situation and if the maximum delay for a respective machine type communications data has not been reached, the network node forwards the machine type communications data to the respective target device within the maximum tolerable delay indicated in the disrupted-connectivity header.

In another exemplary embodiment, the disrupted-connectivity header may further comprise a port number associated to a target machine type communications application running on the target device to receive the respective machine type communications data. Further, according to an exemplary embodiment, the data packets may further comprise a data packet header indicating the address (and optionally a port number) of the network node.

In a further exemplary embodiment, the network node stores the machine type communications data comprised in the one or more data packets, while the determined load status indicates an overload situation.

Furthermore, in an exemplary variation of this further embodiment, the machine type communications data comprised in data packets received during an overload situation and being destined to the same target device or being destined to the same target machine type communications application running on the same target device is aggregated by the network node. When forwarding the machine type communications data to the target device the network node forwards the aggregated machine type communications data via a single connection.

Moreover, in still a further exemplary variation of the embodiment, the machine type communications data which are aggregated for forwarding via the same (one, single) connection are received in data packets from different source machine type communications applications running on the same source device or on different source devices. Hence, the aggregation may not only aggregate machine type communications data received from a single source device, but machine type communications data of different source devices can be aggregated for forwarding via the single connection, if the machine type communications data of the difference sources are destined to the same target device.

In another embodiment, for different data packets with the same disrupted-connectivity header, the disrupted-connectivity header is stored only once by the network node. The one stored disrupted-connectivity header is associated with the stored (aggregated) machine type communications data from said different data packets with the same disrupted-connectivity header.

According to a further embodiment, the network node is configured to discard stored machine type communications data and a disrupted-connectivity header associated to the stored machine type communications data, if said machine type communications data can't be forwarded within the maximum tolerable delay indicated in said associated disrupted-connectivity header due to an overload situation indicated in the load status. Optionally, the network node may inform the one or more source devices that sent the discarded machine type communications data to the network node about the deletion of such discarded machine type communications data by sending a corresponding notification message to the one or more source devices.

In line with the second aspect of the invention, another embodiment suggests a method for configuring a mobile terminal in disrupted-connectivity mode. In this method the network node receives a connection request message in the control plane from a mobile terminal. The connection request message requests the establishment of a connection between the network node and the mobile terminal, and indicates that the requesting mobile terminal is a machine type communication device. Depending on the load situation of the mobile communication system, the network node transmits, in the control plane and to the mobile terminal, a message that informs the mobile terminal that the machine type communications data can only be transmitted in a disrupted-connectivity mode. Such message is exemplarily referred to as connection setup message in the following.

Note that the load situation broadly relates to—for example—an overload situation or any other critical situation in the network, which prohibits the forwarding of the machine type communications data. Such critical situation may be for example given in case a threshold network load is exceeded, e.g. a certain percentage (e.g. 80%, 85%, 80%, 95%, etc.). of the maximum load in the network, or allowed for transmission of machine type communications data.

In response to the connection setup message and in the control plane, the network node receives a message from the mobile terminal. With this message, the mobile terminal confirms the use of the disrupted-connectivity mode for transmission of the machine type communications data. This message is exemplarily referred to as a connection setup complete message in the following. Furthermore, the network nodes and the mobile terminal establish the requested connection to the mobile terminal for transmission of the machine type communications data in disrupted-connectivity mode.

Of course, the steps of the method for configuring a mobile terminal in disrupted-connectivity mode according to the various embodiments described herein may be used in connection with methods according to the first aspect of the invention. Typically, the steps of the method for configuring a mobile terminal in disrupted-connectivity mode will be performed before the mobile terminal (or more generally a source device) transmits machine type communications data in disrupted-connectivity mode. Hence, at least a part of the received one or more data packets mentioned above are transmitted from a mobile terminal to the network node upon the mobile terminal having been configured to use disrupted-connectivity mode.

In another embodiment, the network node determines the load situation of the mobile communication system by determining the load status of the network node, and transmits a connection reject message to the mobile terminal to reject the connection request, if the load status of the network node indicates an overload situation.

According to a further embodiment, the network node determines the load situation of the mobile communication system by (alternatively or further) determining the load status upstream to the network node and transmits a connection reject message to the mobile terminal to reject the connection request, if the load status upstream to the network node indicates an overload situation.

Another embodiment relates to a method for transmitting machine type communication data in a mobile communication system with disrupted connectivity, in which a network component, such as for example a mobile terminal or base station (eNodeB) performs the following. The network component switches from a non-disrupted-connectivity mode to a disrupted-connectivity mode, and in the disrupted-connectivity mode, the network component forms one or more data packets, and transmits the one or more data packets to a network node. Each data packet comprises machine type communication data and a disrupted-connectivity header. The disrupted-connectivity header indicates the maximum tolerable delay for forwarding the machine type communications data and an address of the respective target device to receive the respective machine type communications data.

In a further exemplary embodiment, the network component transmits a connection request message in the control plane to the network node. The connection request message requests the establishment of a connection between the network component and the network node, and indicates that the data to be send is machine type communications data. The network component further receives, in the control plane and from the network node, a connection setup message, which informs the network component that the machine type communications data can only be transmitted in a disrupted-connectivity mode. In response to this message, the network component transmits a connection setup complete message to the network node to confirm the use of the disrupted-connectivity mode for transmission of the machine type communications data. Further, the network component and the network node establish the requested connection for transmission of the machine type communications data in the disrupted-connectivity mode. Please note that the before-mentioned switching from the non-disrupted-connectivity mode to the disrupted-connectivity mode may in the network component be performed in response to the reception of said connection setup message.

In another exemplary embodiment, the one or more data packets are IP packets, and the network component adds a (IP) header to the IP packets. The (IP) header indicates the IP address of the network node as the destination address of the IP data packet(s) conveying the MTC data. Furthermore, the network component may also add an UDP or TCP header, which indicates a destination port number at the network node to which the IP packet(s) are to be delivered.

A further embodiment provides a network node adapted to perform the method for transmitting machine type communication data from at least one machine type communications device within a mobile communication system with disrupted connectivity according to one of the embodiments described herein.

In one more specific exemplary embodiment, such network node may be designated for use in the radio access network or in the core network of the mobile communication system and comprises a receiver for receiving one or more data packets, each data packet comprising machine type communications data and a disrupted-connectivity header indicating the maximum tolerable delay for forwarding the machine type communications data and indicating an address of a target device to receive the respective machine type communications data. The network node may further have a determining unit for determining the load status of the mobile communication. The network node may optionally also comprise a parsing unit configured to parse the data packets, and more specifically, the disrupted-connectivity header, to obtain the parameters contained therein. The network node may also have a transmitter for forwarding the machine type communications data to the respective target device within the maximum tolerable delay indicated in the disrupted-connectivity header, if the load status indicates no overload situation.

A network node of another embodiment comprises a receiver adapted to receive a connection request message in the control plane from a mobile terminal, wherein the connection request message requests the establishment of a connection between the network node and the mobile terminal, and indicates that the requesting mobile terminal is a machine type communications device. The network node may also have a determining unit adapted to determine the load situation of the mobile communication system, and a transmitter to transmit, in the control plane and to the mobile terminal, a connection setup message, wherein the connection setup message informs the mobile terminal that the machine type communications data can only be transmitted in a disrupted-connectivity mode. The receiver is adapted to receive, in response to the connection setup message and in the control plane, a connection setup complete message from the mobile terminal confirming the use of the disrupted-connectivity mode for transmission of the machine type communications data. Moreover, the network node is adapted to establish the requested connection to the mobile terminal for transmission of the of the machine type communications data in disrupted-connectivity mode.

The determining unit and the parsing unit may be for example implemented by a processor of the network node. The parsing unit may be further adapted to parse the various packets of the user plane and control plane traffic that are received by the network node in order to obtain relevant information therefrom. The network node may also comprise a packet forming unit to generate the different data structures of the messages sent by the network node. Also this packet forming unit may be implemented by a processor.

Another embodiment relates to a network component adapted to perform a method for transmitting machine type communication data in a mobile communication system with disrupted connectivity according to one of the embodiments described herein. In one embodiment, the network component is a mobile terminal.

A further embodiment relates to a mobile terminal for transmitting machine type communication data in a mobile communication system with disrupted connectivity. The mobile terminal comprises a transmitter adapted to transmit a connection request message in the control plane to a network node, wherein the connection request message requests the establishment of a connection between the network node and the mobile terminal, and indicates that the mobile terminal is a machine type communication device. Furthermore, the mobile terminal comprises a receiver adapted to receive, in the control plane and from the network node, a connection setup message, wherein the connection setup message informs the mobile terminal that the machine type communications data can only be transmitted in a disrupted-connectivity mode. The transmitter of the mobile terminal is adapted to transmit, in response to the connection setup message and in the control plane, a connection setup complete message to the network node to confirm the use of the disrupted-connectivity mode for transmission of the machine type communications data. The mobile terminal is adapted to establish the requested connection to the mobile terminal for transmission of the machine type communications data in disrupted-connectivity mode.

In another embodiment, the mobile terminal comprises a packet forming unit adapted to form one or more data packets comprising the machine type communications data and a disrupted-connectivity header indicating the maximum tolerable delay for forwarding the machine type communications data. The packet forming unit may be adapted to encapsulate the machine type communication data in each data packet in a disrupted-connectivity header. Moreover, the transmitter of the mobile terminal may be adapted to transmit the one or more data packets to a network node in the radio access network or to a network node in the core network of the mobile communication system.

In another embodiment, the data packets are IP packets and the packet forming unit of the mobile terminal is adapted to add (IP) headers to the data packets. The (IP) headers comprise an IP address of the network node.

Furthermore, the data packets may also comprise a UDP or TCP header, which comprises a port number of the network node as the destination port number. For this, the packet forming unit of the mobile terminal is adapted to comprise the port number associated to the target machine type communications application to receive the respective machine type communications data in the one or more data packets (e.g. in the disrupted connectivity header).

Further, the packet forming unit may be adapted to comprise the address of the target device to receive the respective machine type communications data and/or a port number associated to the target machine type communications application running on the target device to receive the respective machine type communications data in the disrupted-connectivity header.

The packet forming unit may be for example implemented by means of a processor.

A further embodiment relates to a network component (e.g. a mobile terminal a network node) for transmitting machine type communication data in a mobile communication system with disrupted connectivity. The network component comprises a packet forming unit configured to form, in a disrupted-connectivity mode, one or more data packets, each data packet comprising machine type communication data and a disrupted-connectivity header, wherein the disrupted-connectivity header indicates the maximum tolerable delay for forwarding the machine type communications data and an address of the respective target device to receive the respective machine type communications data. Furthermore the network component comprises a transmitter configured to transmit the one or more data packets to a network node.

A further embodiment described herein relates to a computer program having a program code for performing the method for transmitting machine type communication data from at least one machine type communications device within a mobile communication system with disrupted connectivity according to one of the embodiments described herein, when the computer program runs on a computer. Another embodiment described herein relates to a computer program having a program code for performing the method for transmitting machine type communication data in a mobile communication system with disrupted connectivity according to one of the embodiments described herein, when the computer program runs on a computer.

One exemplary embodiment, relates to a computer readable medium storing instructions that, when executed by a processor of a mobile terminal, cause the mobile terminal to transmit machine type communication data in a mobile communication system with disrupted connectivity, by transmitting a connection request message in the control plane to a network node, wherein the connection request message requests the establishment of a connection between the network node and the mobile terminal, and indicates that the mobile terminal is (or is treated as) a machine type communication device; receiving, in the control plane and from the network node, a connection setup message, wherein the connection setup message informs the mobile terminal that the machine type communications data can only be transmitted in a disrupted-connectivity mode; transmitting, in response to the connection setup message and in the control plane, a connection setup complete message to the network node to confirm the use of the disrupted-connectivity mode for transmission of the machine type communications data; and establishing the requested connection to the mobile terminal for transmission of the of the machine type communications data in disrupted-connectivity mode.

Optionally, the computer readable medium further stores instructions that, when executed by the processor of a mobile terminal, cause the mobile terminal to form one or more data packets comprising the machine type communications data and an address of the respective target device to receive the respective machine type communications data, encapsulate the machine type communication data in each data packet in a disrupted-connectivity header indicating a maximum tolerable delay for forwarding the machine type communications data and an address of a target device to receive the respective machine type communications data, and transmit the one or more data packets to a network node in the radio access network or the core network of the mobile communication system.

A further embodiment relates to a computer readable medium storing instructions that, when executed by a processor of a mobile terminal, cause the mobile terminal to transmit machine type communication data in a mobile communication system with disrupted connectivity, by forming one or more data packets comprising machine type communications data and a disrupted-connectivity header. The instructions may optionally cause the mobile terminal to encapsulate the machine type communication data in each data packet in a disrupted-connectivity header indicating a maximum tolerable delay for forwarding the machine type communications data and an address of a target device to receive the respective machine type communications data, and to transmit the one or more data packets to a network node.

The computer readable medium of the embodiments above may further store instructions that, when executed by the processor of a mobile terminal, cause the mobile terminal to comprise the port number associated to the target machine type communications application to receive the respective machine type communications data in the one or more data packets.

The computer readable medium of the embodiments above may further store instructions that, when executed by the processor of a mobile terminal, cause the mobile terminal to comprise the address of the target device to receive the respective machine type communications data and/or said port number associated to the target machine type communications application to receive the respective machine type communications data in the disrupted-connectivity header.

A further embodiment relates to a computer readable medium storing instructions that, when executed by a processor of a network node in the radio access network or in the core network of the mobile communication system, cause the network node to transmit machine type communication data from machine type communications devices within a mobile communication system with disrupted connectivity, by receiving one or more data packets comprising machine type communications data and a disrupted-connectivity header indicating a maximum tolerable delay for forwarding the machine type communications data and an address of a target device to receive the respective machine type communications data. The machine type communication data in each data packet may be encapsulated by a disrupted-connectivity header. The instructions may further cause the network node to determine the load status of the mobile communication, and if the load status indicates no overload situation, to forward the machine type communications data to the respective target device.

Another embodiment relates to a computer readable medium storing instructions that, when executed by a processor of a network node in the radio access network or in the core network of the mobile communication system, cause the network node to transmit machine type communication data from machine type communications devices within a mobile communication system with disrupted connectivity, by receiving a connection request message in the control plane from a mobile terminal, wherein the connection request message requests the establishment of a connection between the network node and the mobile terminal, and indicates that the requesting mobile terminal is a machine type communication device; determining the load situation of mobile communication system; and transmitting, in the control plane and to the mobile terminal, a connection setup message, wherein the first connection setup message informs the mobile terminal that the machine type communications data can only be transmitted in a disrupted-connectivity mode. The instructions may further cause the network node to receive, in response to the connection setup message and in the control plane, a connection setup complete message from the mobile terminal confirming the use of the disrupted-connectivity mode for transmission of the machine type communications data, and establish the requested connection to the mobile terminal for transmission of the machine type communications data in disrupted-connectivity mode.

BRIEF DESCRIPTION OF FIGURES

In the following embodiments of the invention are described in more detail in reference to the attached figures and drawings. Similar or corresponding details in the figures are marked with the same reference numerals.

DETAILED DESCRIPTION

Figure 1:
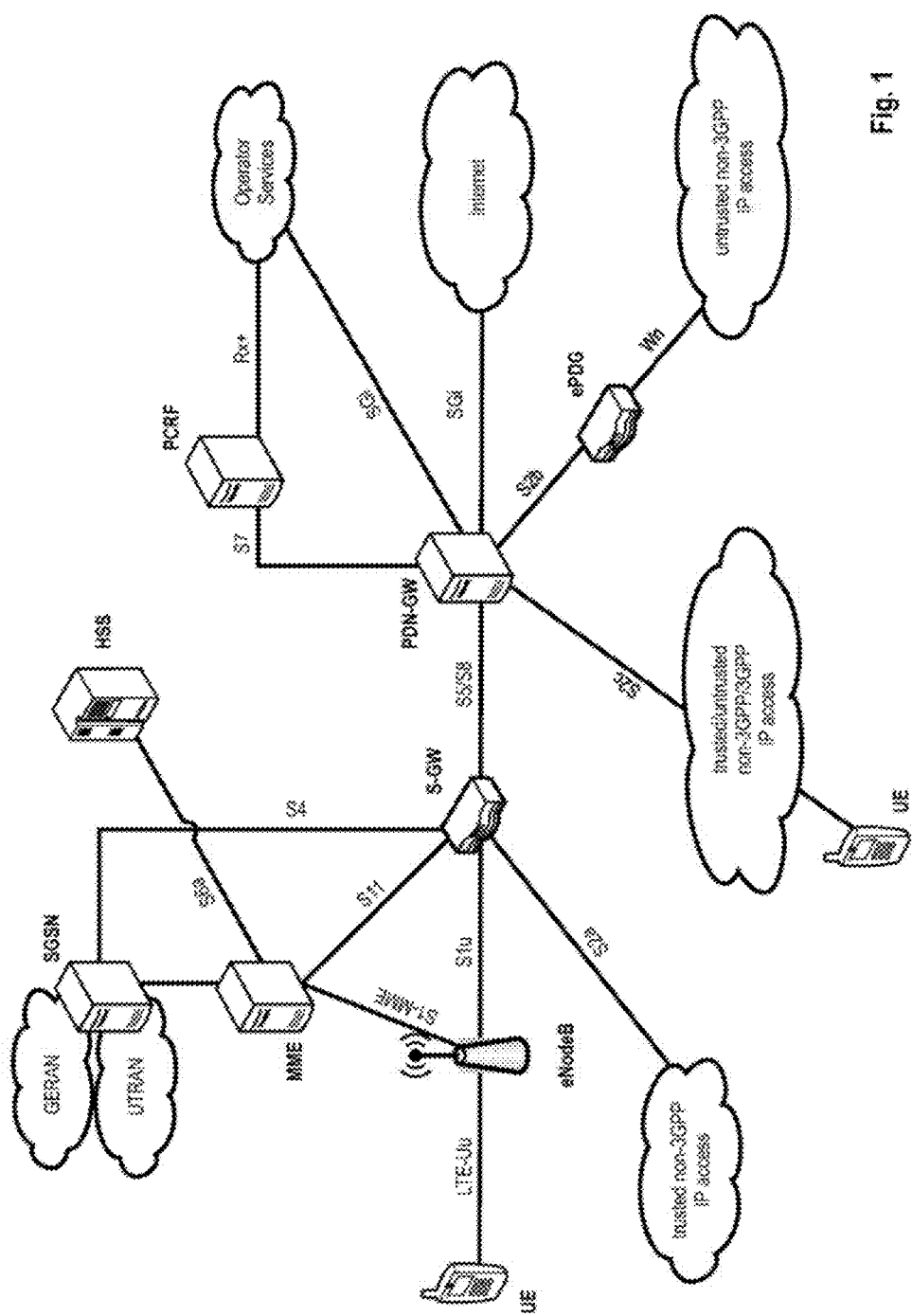
FIG. 1 shows the architecture of an LTE/LTE-A system.
Figure 2:
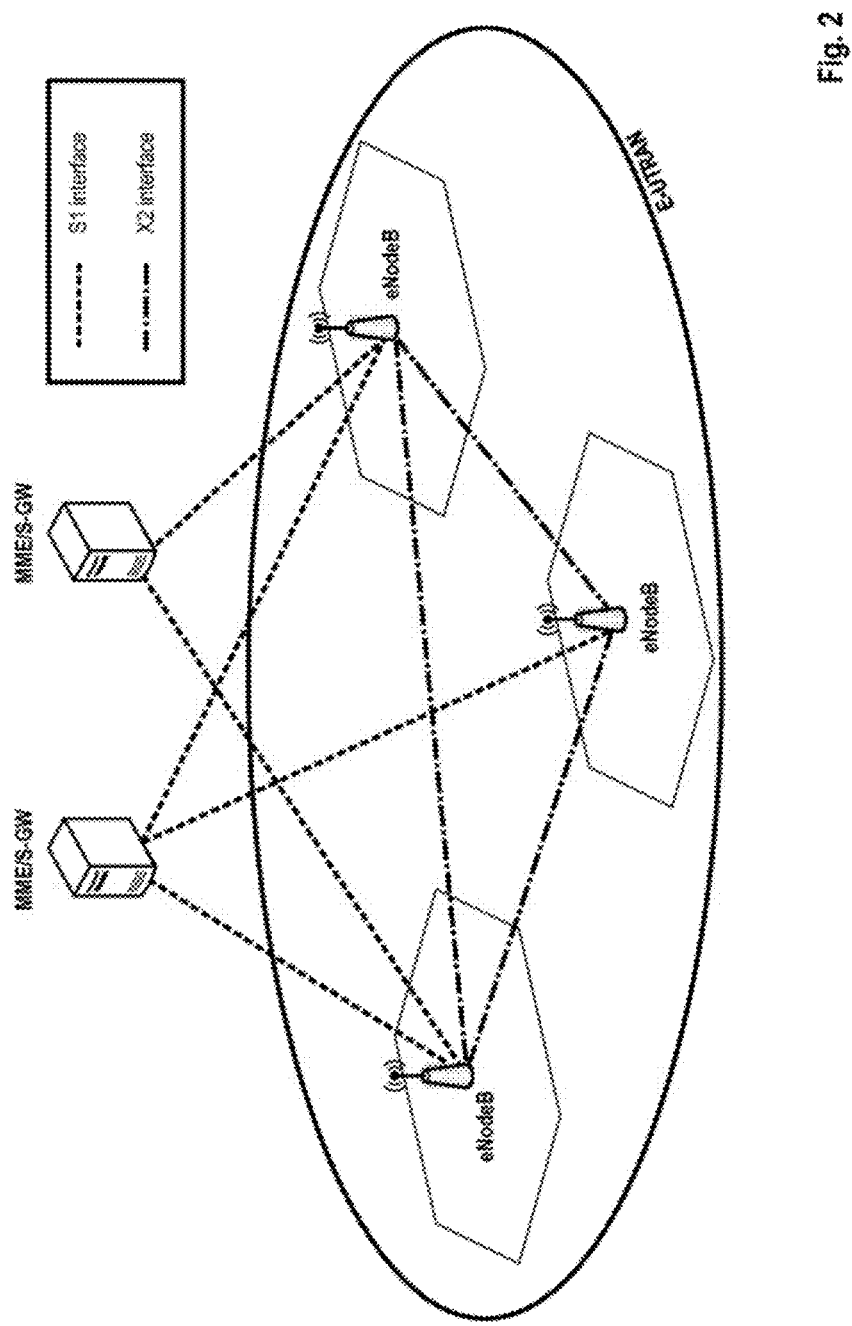
FIG. 2 illustrates the E-UTRAN architecture of the an LTE/LTE-A system.

The following paragraphs will describe various embodiments of the different aspects. For exemplary purposes only, most of the embodiments are outlined in relation to an orthogonal single-carrier uplink radio access scheme according to 3GPP LTE (Release 8/9) and LTE-A (Release 11) mobile communication systems, partly discussed in the Technical Background section above. It should be noted that the invention may be advantageously used for example in a mobile communication system such as 3GPP LTE-A (Release 11) communication systems, as described in the Technical Background section above, and beyond, but the invention is not limited to its use in this particular exemplary communication networks. The invention may be broadly used in communication systems where machine type communications is used, including but not limited to radio access networks and/or core networks of wireless systems, like WLAN of the IEEE 802.11 standard family, WiMAX of the IEEE 802.16 family, etc.

As already noted above, in one aspect of the invention, a first aspect of the invention relates to the introduction of a disrupted-connectivity mode for the transmission of machine type communications (MTC) data. When transmitting MTC data in disrupted-connectivity mode, a network node temporarily stores MTC data received from one or more downstream sources while the network load does not allow for forwarding the MTC data. When the network load changes and allows for forwarding the MTC data, the network node forwards the MTC data upstream towards the target device(s) to receive the MTC data. There may be one or more such network nodes in the transmission path of the MTC data. In disrupted-connectivity mode, the MTC data is transmitted by a source device together with a disrupted-connectivity header which indicates relevant parameters for the transmission of the MTC data, e.g. the maximum tolerable delay of its transmission/forwarding, an address of the target device to receive the data, and, optionally, the port number associated to the target application to receive the MTC data.

Furthermore, the network node may aggregate MTC data intended for reception by the same target device or MTC application, and may forward the aggregated MTC data to the target device or MTC application using one (single) connection. The forwarding of MTC data in an aggregated fashion may also be referred to as batch forwarding of MTC data. For example, and not limited to these options, the one (single) connection could be a single bearer service (e.g. an EPS bearer of within a 3GPP-based core network) or may be realized by repacking the aggregating MTC data in data packets destined to the target device or target MTC application. For aggregation, it may be feasible that the structure of the MTC data is self-contained, i.e. the individual pieces of MTC data can be identified by the target application, even if they are forwarded together in one or more data packets. The MTC data aggregation and batch forwarding mechanism may be protocol agnostic in the sense that the network node(s) in the transmission path of the MTC data do not have to know the details of the MTC application protocols.

Compared to normal (instantaneous) end-to-end connectivity, the disrupted connectivity may allow for dynamically segmenting an end-to-end connection into sub-connections. Each sub-connection may cache and aggregate the mobile communications data according to the network load status and connectivity requirements, such as the maximum tolerable delay of its transmission/forwarding of the MTC data. As regards the optional data aggregation mechanism, MTC data from multiple connections (or sources) can be forwarded towards MTC application with a single connection.

Different embodiments of this aspect will be discussed in the following. As will become more apparent, a network node receiving data packets containing MTC data from downstream sources may cache and optionally aggregate the received MTC data. Upon reception, the network node may check the allowed delay for the MTC data (block) and caches the data block. The allowed delay may be for example obtained from a disrupted connectivity header comprised in the data packets.

As will be explained in further detail with respect to FIGS. 9 and 10 below, when aggregating the MTC data destined to a common target device or target MTC application, the network node may pack multiple MTC data blocks (with similar delay requirements) from one or multiple sources (for example, UEs sending MTC data belonging to the same MTC application, or to be received by the same target device) into one data block, which is to be sent in one or more data packets towards a target device. The cached and aggregated data block may be marked with maximum delay information.

Note that in some embodiments, MTC data may be dropped (discarded) at the network node, if the maximum delay is exceeded. Pre-defined policies may be used in dropping the MTC data. Optionally, a notification may be sent by the network node to the source devices that sent the MTC data to the network node which is dropped, so as to indicate to the source devices that the MTC data timed out and was dropped.

Furthermore, as the forwarding of the cached MTC data is dependent on the network load situation, the network node may keep track of the load status of nodes in the transmission path of the MTC data towards the target device to receive the MTC data. When the network is available (i.e. the load status allows forwarding the MTC data), the network node may transmit the MTC data (e.g. aggregated to a data block) to the target device, e.g. a MTC application server, or the next-hop network node in the transmission path. As noted earlier, a single connection may be used for transmit aggregated data blocks. In comparison, in state-of-the art 3GPP systems, a separate EPS bearer connection would be established for each MTC connectivity request.

Figure 8:
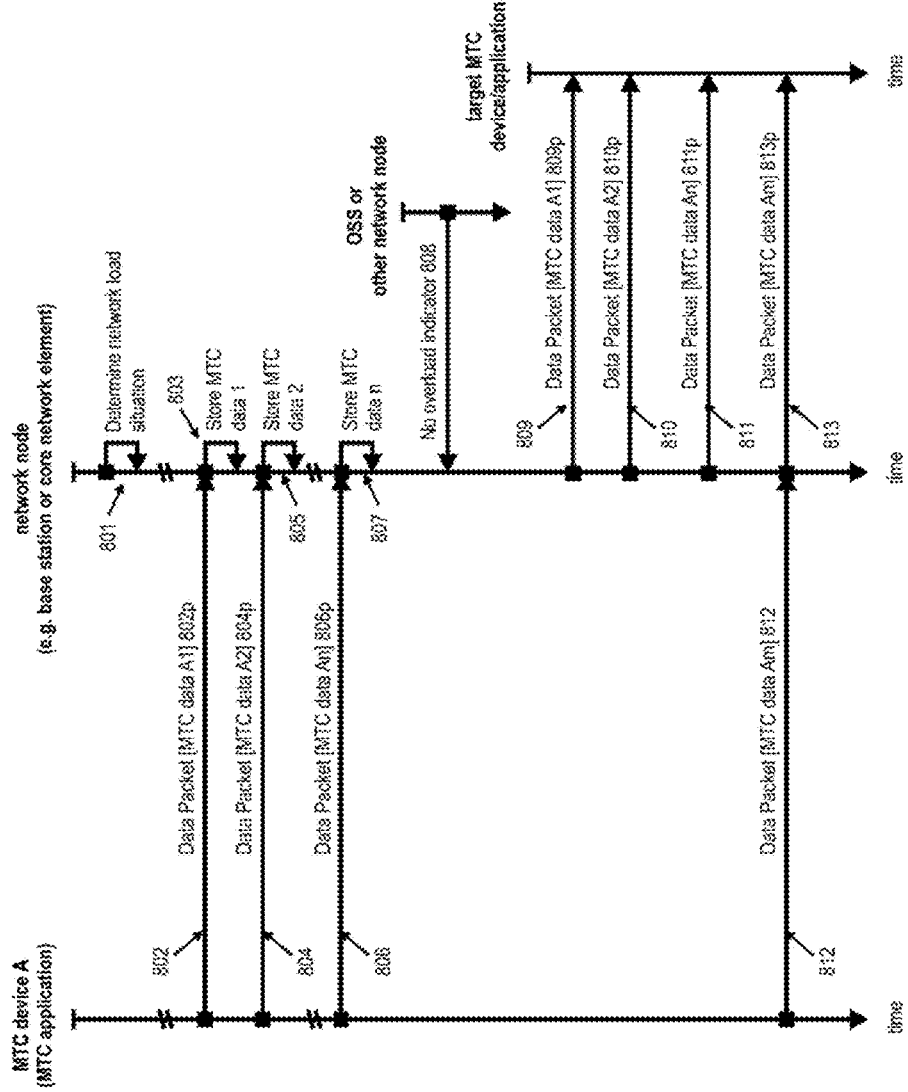
FIG. 8 shows an exemplary flow of messages illustrating the forwarding of machine type communications data by the operation of a network node according to an exemplary embodiment of the invention.

FIG. 8 shows an exemplary flow of messages illustrating the forwarding of MTC data by the operation of a network node according to an exemplary embodiment. A network node, such as for example a base station (eNodeB) or another core network element in the mobile communication system (e.g. SGSN, MME, S-GW, P-GW, etc.) may determine 801 the network load situation.

Here it is exemplarily assumed that the load situation is determined based on a network load profile, e.g. a load profile of RAN and/or core network, and/or a real time load status. For this purpose the network node may optionally obtain network-wide load information from an operational support system (OSS) or directly from core network nodes to determine the real time load status. Performance monitoring applications in OSS (continuously) monitor the load status of RAN and/or core network nodes and, based on the monitored results, OSS may generate different types of load descriptions for each monitored network node.

One load description generated by OSS and provided to the network node may be a network load profile which is based on the periodic characteristics of network load (both temporal and spatial). The OSS carries out statistical analysis on node loads (e.g. MMEs, S-GWs, P-GWs, etc.) at different timeslots and generates a load profile for a respective node. For example, OSS may use the load information of the past month, calculate hourly (average) load, and generate a simple daily load profile. OSS may further use data mining techniques to filter the outlier data and improve the accuracy of the generated load profiles.

Another load description that may be generated and provided by OSS is a real time load status updates. OSS may collect real time load information from network nodes loads (e.g. MMEs, S-GWs, P-GWs, etc.) and generates real time load reports, which may be periodically sent to interested nodes, e.g. the eNodeBs.

In the embodiment, OSS, as the major O&M (operational management) supporting system, transmits the generated load reports (load profile(s) and/or real time updates) to the network node. The network node uses the generated profile(s) for determining 801 the load status, based on which the network node may decide whether MTC data received from downstream sources are to be cached or whether (cached and newly arriving) MTC data can be forwarded upstream to the next-hop node in the transmission path of the MTC data. For example, the network node could compare the determined network load status to a configurable or predefined load threshold, and when this threshold is exceeded, the network node determines that the MTC data cannot be forwarded and need to be cached, and otherwise, the MTC data can be forwarded without caching. Such threshold may be set for the upstream traffic in general, or specifically for MTC data transmission. Furthermore, the network node may continuously (e.g. periodically, or in response to MTC data being received or cached) evaluate the network load situation to decide whether to cache the MTC data arriving at the network node or whether the network node can forward (cached and newly arriving) MTC data.

Alternatively to the network node evaluating the load reports from OSS as described above, this functionality could be also performed in another element (e.g. MME) of the core network, which may then inform the network node (e.g. by means of an overload indicator), whether the network node is to cache the MTC data arriving at the network node or whether the network node is to forward (cached and newly arriving) MTC data. In this exemplary variant, the network node may continue to receive such overload indication e.g. in intervals, or in response to a change of the network load situation.

Returning to FIG. 8, it is assumed that the determination 801 of the network load situation indicates that MTC data cannot be forwarded by the network node.

Accordingly, upon reception 802, 804, 806 of data packets 802p, 804p, 806p from an MTC device A, the network node (temporarily) stores 803, 805, 807 the respective pieces of MTC data (MTC data A1, MTC data A2, . . . MTC data An).

As will be explained in further detail below in connection with FIG. 12 to FIG. 14, the data packets 802*p*, 804*p*, 806*p* received from an MTC device A each comprise a disrupted-connectivity header, which indicates the QoS requirements of the MTC data (MTC data A1, MTC data A2, . . . MTC data An) and at least the address of the target device to receive the MTC data. In one embodiment, the QoS requirements indicated in the disrupted-connectivity header is a maximum tolerable delay for forwarding the MTC data (MTC data A1, MTC data A2, . . . MTC data An) comprised in the data packets 802*p*, 804*p*, 806*p*.

In FIG. 8, it is assumed for exemplary purposes that upon having received 806 the data packet 806*p*, the network node determines or is notified by a (no) overload indicator 808 from OSS or another network node that the network load status has changed (i.e. is no longer critical), so that the network node may now forward newly arriving and cached MTC data.

Accordingly, the network node forwards 809, 810, 811 the cached MTC data (MTC data A1, MTC data A2, . . . MTC data An) in data packets 809*p*, 810*p*, 811*p* towards the target MTC device A or application. New MTC data (MTC data Am) received 812 by the network node in one or more data packets 812*p* may now be immediately forwarded 813 by the network node by sending them as data packet(s) 813*p* towards the target MTC device A or application.

In a more detailed exemplary implementation, the data packets 802*p*, 804*p*, 806*p*, 809*p*, 810*p*, 811*p* are IP packets. In this example, it may be further assumed that the data packets 802*p*, 804*p*, 806*p* are sent by the MTC device A to the IP address of the network node as the destination address. When forwarding the cached MTC data (MTC data A1, MTC data A2, . . . MTC data An) in IP packets 809*p*, 810*p*, 811*p*, the network node sets its own IP address as the source address and the IP address of the target MTC device as the destination address of the IP packets 809*p*, 810*p*, 811*p*. Accordingly, two connections are used for forwarding the MTC data (MTC data A1, MTC data A2, . . . MTC data An): One connection between the MTC device A and the network node and another one between the network node and the target MTC device. In the 3GPP context, in case the network node is eNodeB, the connection between the eNodeB and the target MTC device may include a EPS bearer service.

Figure 3:
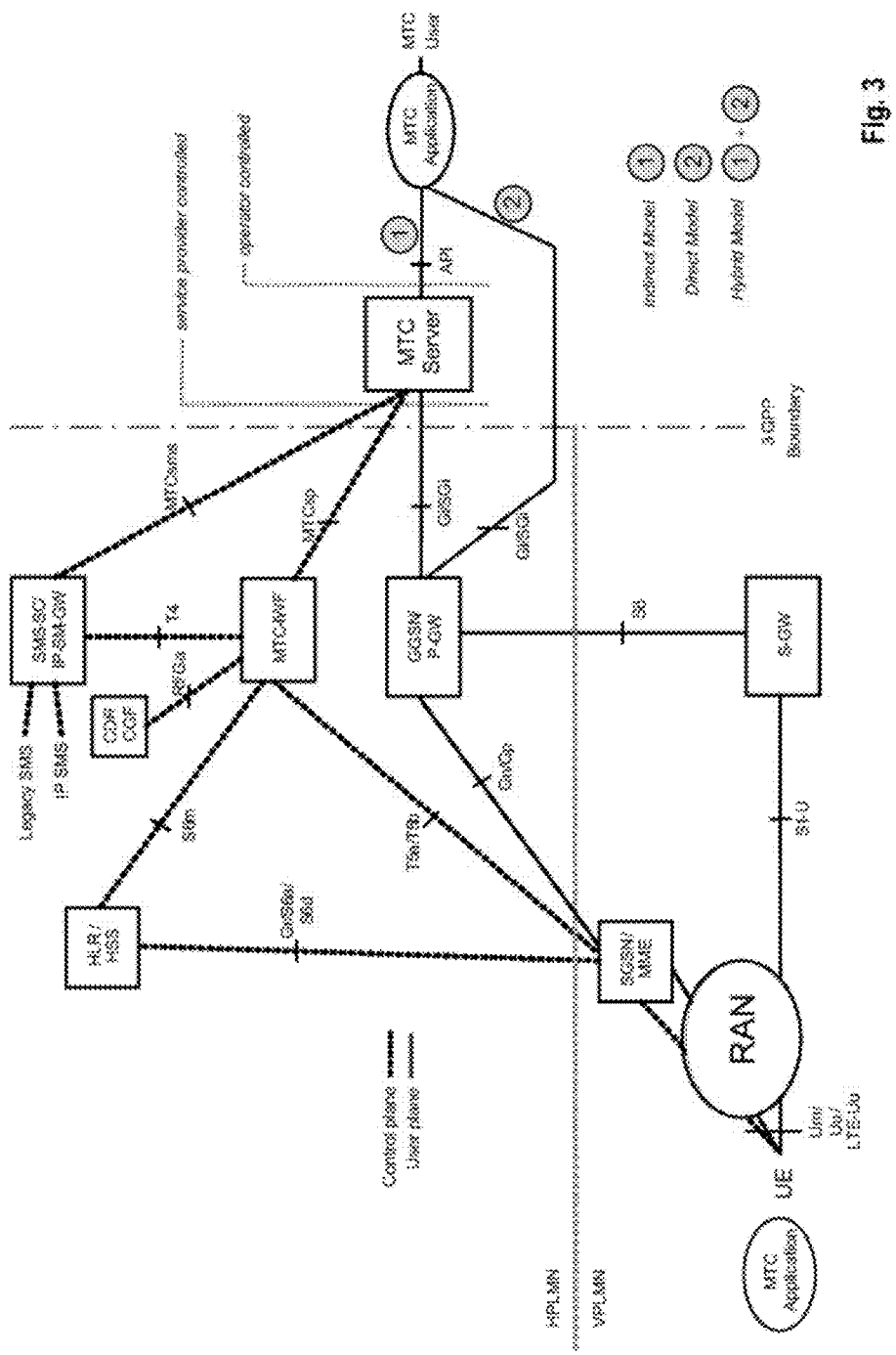
FIG. 3 illustrates the roaming architecture for 3GPP Architecture for Machine-Type Communication for a so-called home routed scenario as specified in 3GPP TR 23.888.
Figure 4:
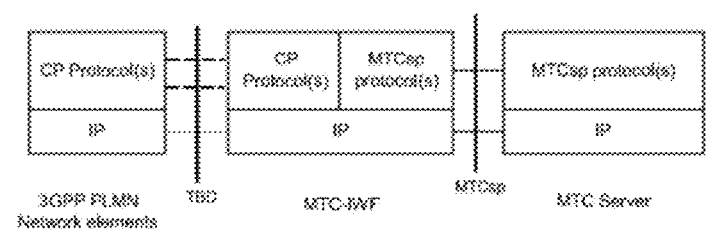
FIG. 4 illustrates the MTCsp protocol stack for Machine type communications architecture as specified in 3GPP TR 23.888.

Further note that in the 3GPP context, the target MTC device may be for example an MTC (indirect model—see FIG. 3) or it may be another network node inside the 3GPP core network or outside thereof in a PLMN (direct model—see FIG. 3). Further note, that in case the target MTC device is the MTC server, the target MTC application may be executed on the MTC server or another network device, so that in the latter case the MTC Server will forward the MTC data to the network device executing the MTC application.

In the exemplary embodiments discussed in connection with FIG. 8 above, the network node did not aggregate the MTC data (MTC data A1, MTC data A2, . . . MTC data An). Such improvement will be discussed below in connection with FIG. 9, which shows another exemplary flow of messages illustrating the forwarding and aggregation of MTC data by a network node according to an exemplary embodiment, which is similar to FIG. 8. However, instead of individually forwarding the cached pieces of MTC data (MTC data A1, MTC data A2, . . . MTC data An), the network node aggregates the cached pieces of MTC data (MTC data A1, MTC data A2, . . . MTC data An) received from the MTC device A into one block of data and transmits 901 the aggregated block of data in one or more data packets 901*p* towards the target MTC device or application e.g. using one (and the same, single) connection.

Note that in case of caching and aggregating the MTC data (MTC data A1, MTC data A2, . . . MTC data An), the network node does not need to cache the entire data packets 802*p*, 804*p*, 806*p* for forwarding. Assuming that the aggregated MTC data (MTC data A1, MTC data A2, . . . MTC data An) are all intended for reception by the same target MTC device/application, one may also assume that they have all the same requirements as to maximum delay. Accordingly, the information of the disrupted-connectivity header may only be stored once for MTC data (MTC data A1, MTC data A2, . . . MTC data An) belonging to the same target MTC device/application. Note that the network node uses the address information on the target MTC device contained in the disrupted-connectivity header of data packets 802*p*, 804*p*, 806*p* to identify data packets being destined to the same target MTC device.

If the disrupted-connectivity header further includes the port number for the MTC data on the target MTC device, the network node may optionally aggregate the MTC data (MTC data A1, MTC data A2, . . . MTC data An) for each target MTC application identified by the address-and-port tuple in the disrupted-connectivity header, and may forward the aggregated MTC data per MTC application. In the latter case, the network node may only store one disrupted-connectivity header for the all MTC data belonging to the same target MTC application, respectively, address-and-port tuple (and having the same delay requirements).

Figure 9:
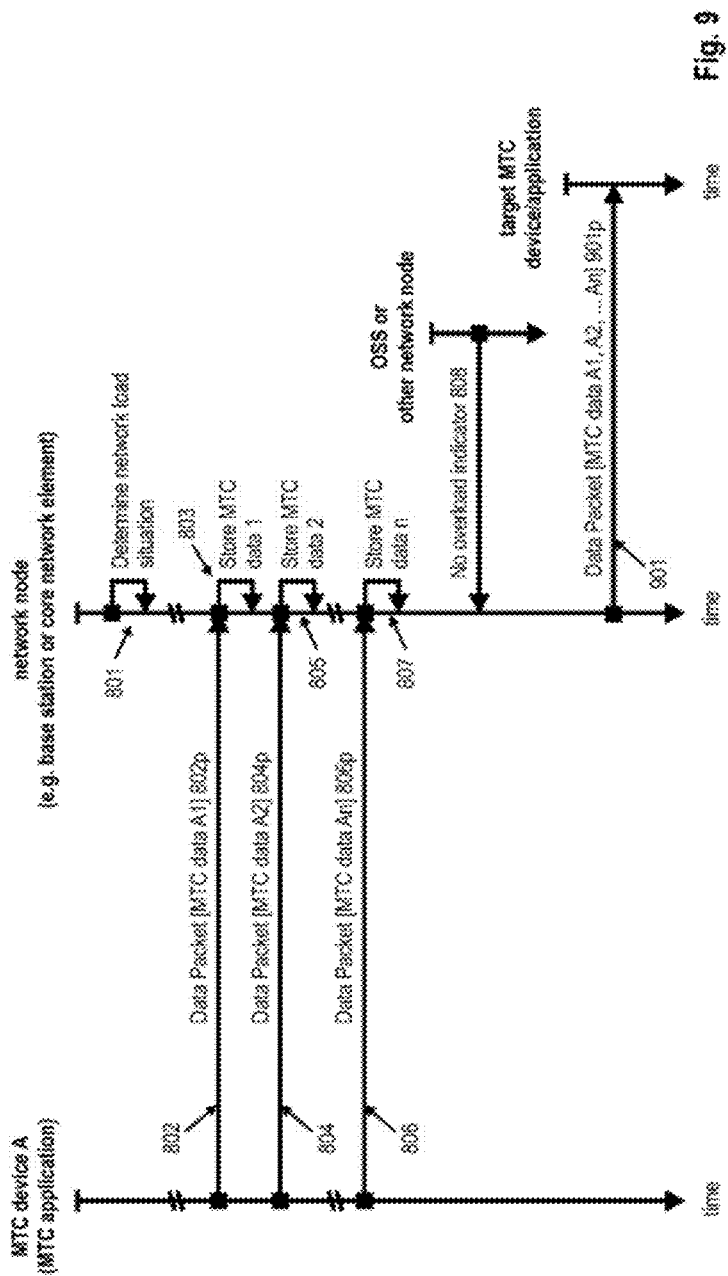
FIG. 9 shows another exemplary flow of messages illustrating the forwarding and aggregation of machine type communications data by a network node according to an exemplary embodiment of the invention.

In case not the entire data packets 802*p*, 804*p*, 806*p* are cached by the network node, steps 803, 805, 807 as shown in FIGS. 8 and 9 may be modified and further include the network node parsing upon reception 802, 804, 806 of a respective one of data packets 802*p*, 804*p*, 806*p*, the disrupted-connectivity header of the respective data packet and storing only the MTC data of the respective data packet, if the disrupted-connectivity header is already cached. The network node also assures that the MTC data of the respective data packet is associated to the cached disrupted-connectivity header, so that the MTC data of the respective data packet can be properly aggregated into a block for forwarding together with other MTC data destined to the same target MTC device/application.

In the example of FIG. 9, and assuming that data packet 802*p* is the first data packet with MTC data received from the MTC device A, the network node would cache the MTC data A1 together with the disrupted-connectivity header. For data packets 804*p* and 806*p*, the network node would recognize that the disrupted-connectivity header of these data packet contains the same address of the target MTC device (and the same port number, if present) as present in the already cached disrupted-connectivity header of data packet 802*p*, so that the network node only stores MTC data A2 and MTC data An and associates them to the cached disrupted-connectivity header of data packet 802*p*.

The aggregation mechanism discussed in connection with FIG. 9 above has been described for an aggregation of MTC data per-MTC device and per-target MTC device/application. However, in another embodiment, the aggregation may be also only per target MTC device/application, or in other words MTC data from different MTC devices destined to the same target MTC device/application can be aggregated and forwarded together. FIG. 10 shows an exemplary flow of messages illustrating such forwarding and aggregation of MTC data received from different sources by a network node according to an exemplary embodiment.

Figure 10:
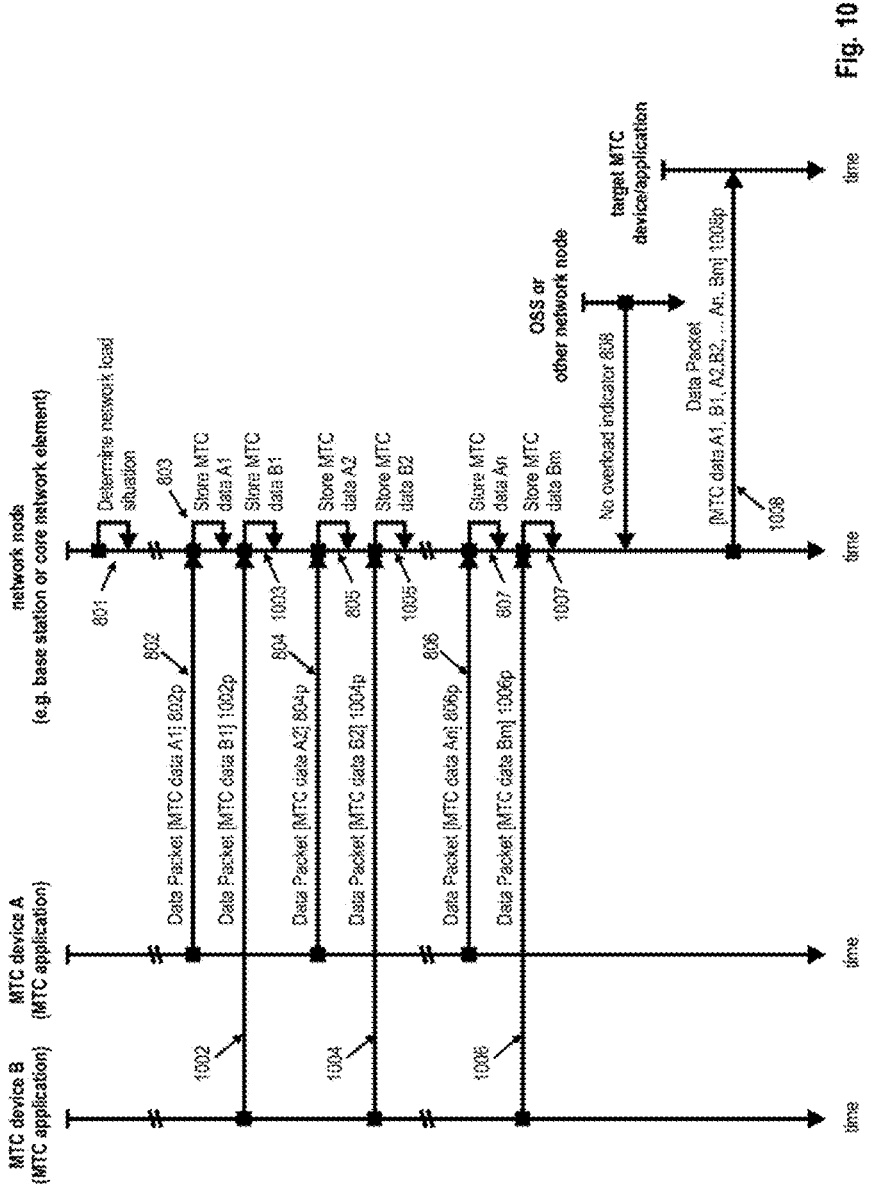
FIG. 10 shows an exemplary flow of messages illustrating the forwarding and aggregation of machine type communications data received from different sources by a network node according to an exemplary embodiment of the invention.

As shown in FIG. 10, the reception 802, 804, 806 of data packets 802*p*, 804*p*, 806*p* from MTC device A and the caching 803, 805, 807 of their MTC data (MTC data A1, A2, . . . , An) and disrupted-connectivity header is similar as described in connection with embodiments related to FIG. 9 above. Further, the reception 1002, 1004, 1006 of data packets 1002*p*, 1004*p*, 1006*p* from MTC device B and the caching 1003, 1005, 1007 of their MTC data (MTC data B1, B2, . . . Bn) and disrupted-connectivity header is similar to the reception 802, 804, 806 of data packets 802*p*, 804*p*, 806*p* from MTC device A and the caching 803, 805, 807 of their MTC data (MTC data A1, A2, . . . , An) and disrupted-connectivity header as described in connection with embodiments related to FIG. 9 above.

As described in connection with FIG. 9 above, the network node does not need to cache the entire data packets 802*p*, 804*p*, 806*p*, 1002*p*, 1004*p*, 1006*p* for forwarding. Also in the example of FIG. 10, the information of the disrupted-connectivity header may only be stored once for MTC data (MTC data A1, MTC data A2, . . . MTC data An, MTC data B1, MTC data B2, . . . MTC data Bn) belonging to the same target MTC device/application (and having the same delay requirements). Also here, the network node uses the address information on the target MTC device contained in the disrupted-connectivity header of data packets 802*p*, 804*p*, 806*p*, 1002*p*, 1004*p*, 1006*p*, to identify data packets being destined to the same target MTC device.

If the disrupted-connectivity header further includes the port number for the MTC data on the target MTC device, the network node may optionally aggregate the MTC data (MTC data A1, MTC data A2, . . . MTC data An, MTC data B1, MTC data B2, . . . MTC data Bn) for each of the multiple sources (MTC device A and B) and for each target MTC application identified by the address-and-port tuple in the disrupted-connectivity header, and may forward the aggregated MTC data per MTC application. In the latter case, the network node may only store one disrupted-connectivity header for the all MTC data belonging to the same target MTC application, respectively, address-and-port tuple.

In case not the entire data packets 802*p*, 804*p*, 806*p*, 1002*p*, 1004*p*, 1006*p* are cached by the network node, steps 803, 805, 807, 1003, 1005, 1007 in FIG. 10 may be similar to steps 803, 805, 807 in FIG. 9. The network node may parse, upon reception 802, 804, 806 of a respective one of data packets 802*p*, 804*p*, 806*p*, 1002*p*, 1004*p*, 1006*p*, the disrupted-connectivity header of the respective data packet and store only the MTC data of the respective data packet, if the disrupted-connectivity header is already cached, and assures that the MTC data of the respective data packet is associated to the cached disrupted-connectivity header, so that the MTC data of the respective data packet can be properly aggregated into a block for forwarding together with other MTC data destined to the same target MTC device/application.

In the example of FIG. 10, and assuming that data packet 802*p* is the first data packet with MTC data received from MTC devices A and B, the network node would cache the MTC data A1 together with the disrupted-connectivity header. For data packets 804*p*, 806*p*, 1002*p*, 1004*p* and 1006*p*, the network node would recognize that the disrupted-connectivity header of these data packets contains the same address of the target MTC device (and the same port number, if present) as present in the already cached disrupted-connectivity header of data packet 802*p*, so that the network node only stores MTC data B2, MTC data Bn, MTC data B1, MTC data B2, . . . MTC data Bn and associates them to the cached disrupted-connectivity header of data packet 802*p*.

Figure 11:
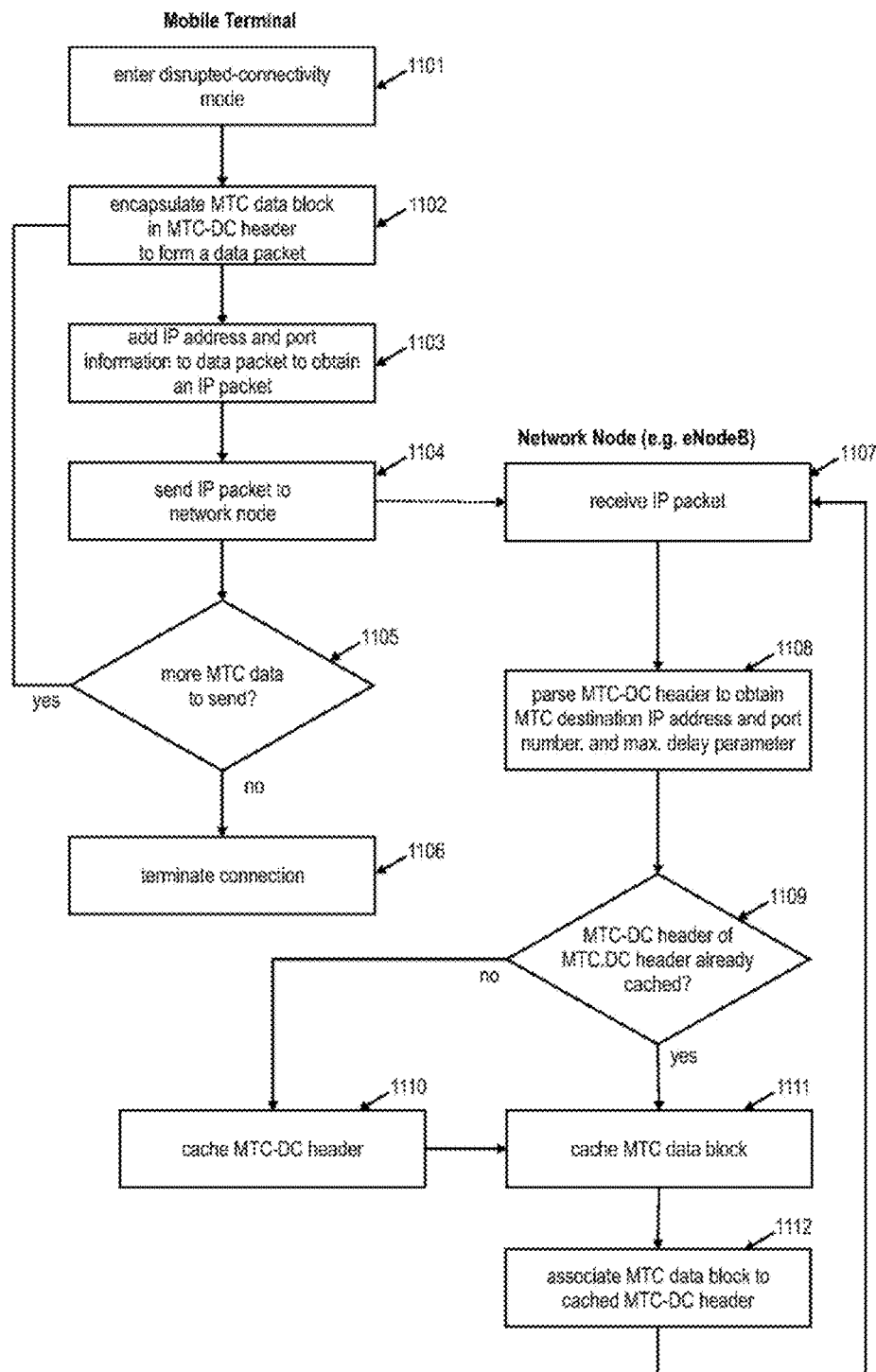
FIG. 11 shows an exemplary flow chart of an operation of a mobile terminal according to an embodiment of the invention, in which the mobile terminal transmits MTC data in disrupted-connectivity mode.

FIG. 11 shows an exemplary flow chart of an operation of a mobile terminal and a network node (e.g. eNodeB) according to an embodiment, in which the mobile terminal transmits MTC data in disrupted-connectivity mode. The flow chart of FIG. 11 reflects the operation of the mobile terminal and network node in the exchange of messages as exemplarily described above in connection with FIGS. 8 to 10. In the example of FIG. 11, the network node is a base station (e.g. eNodeB).

The mobile terminal switches 1101 to disrupted-connectivity mode. As will be explained in connection with the second aspect in more detail, this switching from non-disrupted-connectivity mode (normal connectivity mode) to disrupted-connectivity mode may be for example caused by the mobile terminal receiving a corresponding command or request in the course of a signaling procedure, e.g. a signaling procedure to set up a connection to a network node in order to transmit MTC data.

Figure 5:
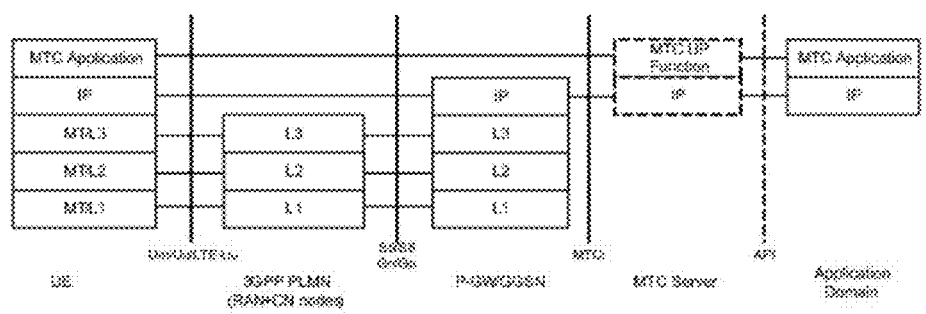
FIG. 5 shows the user plane stack for Machine type communications architecture as specified in 3GPP TR 23.888, FIG. 6 exemplifies the mapping of different traffic flows onto the corresponding PDN connections using TFTs, FIG. 7 exemplifies the mapping of different traffic flows of multiple UEs onto respective corresponding PDN connections using TFTs.
Figure 6:
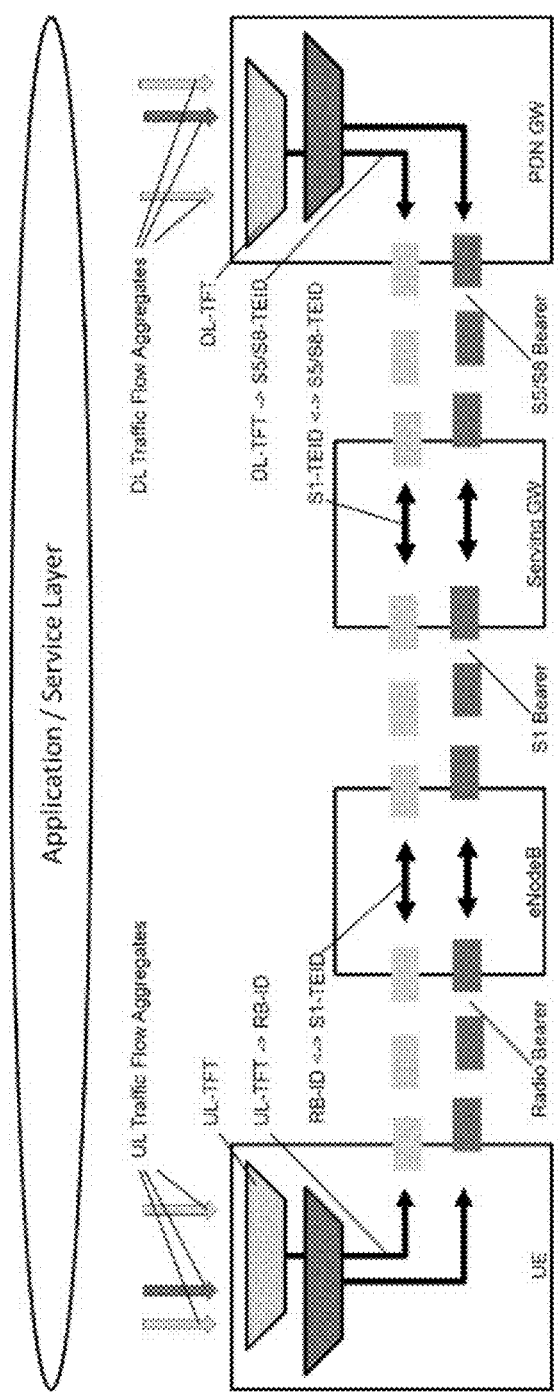
Figure 7:
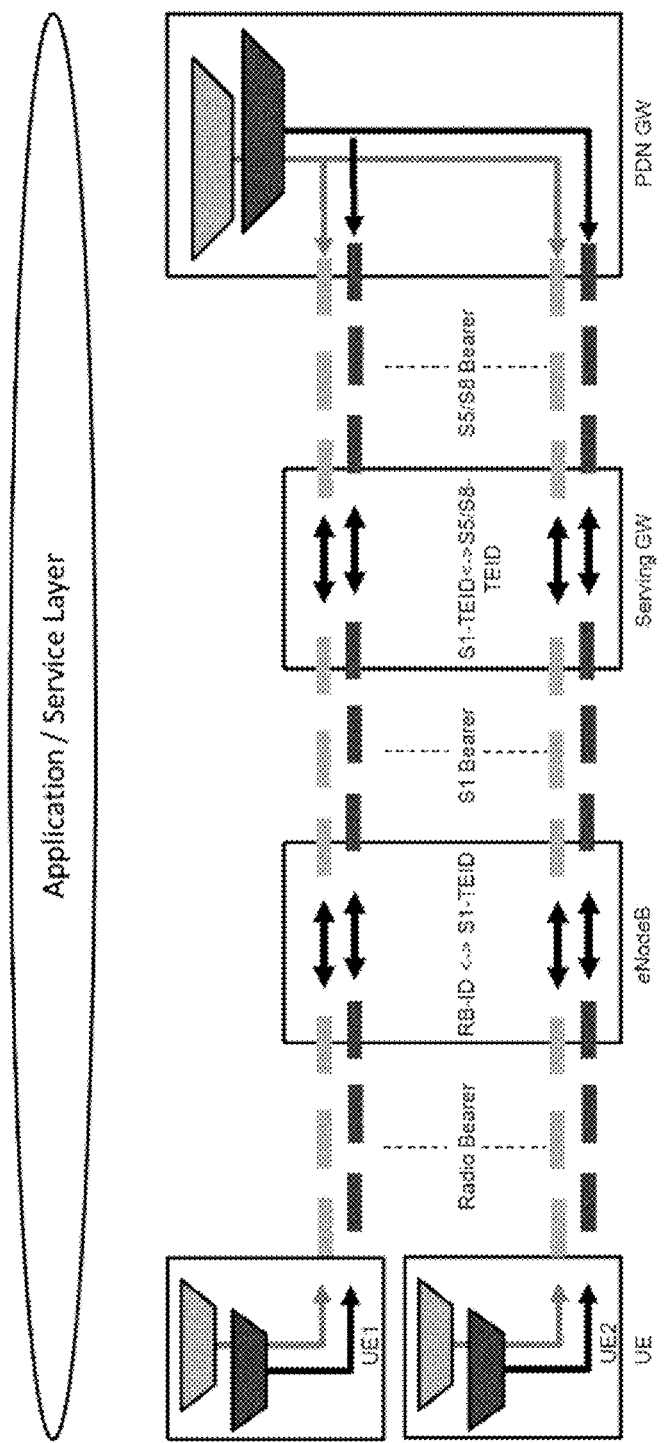
Figure 12:
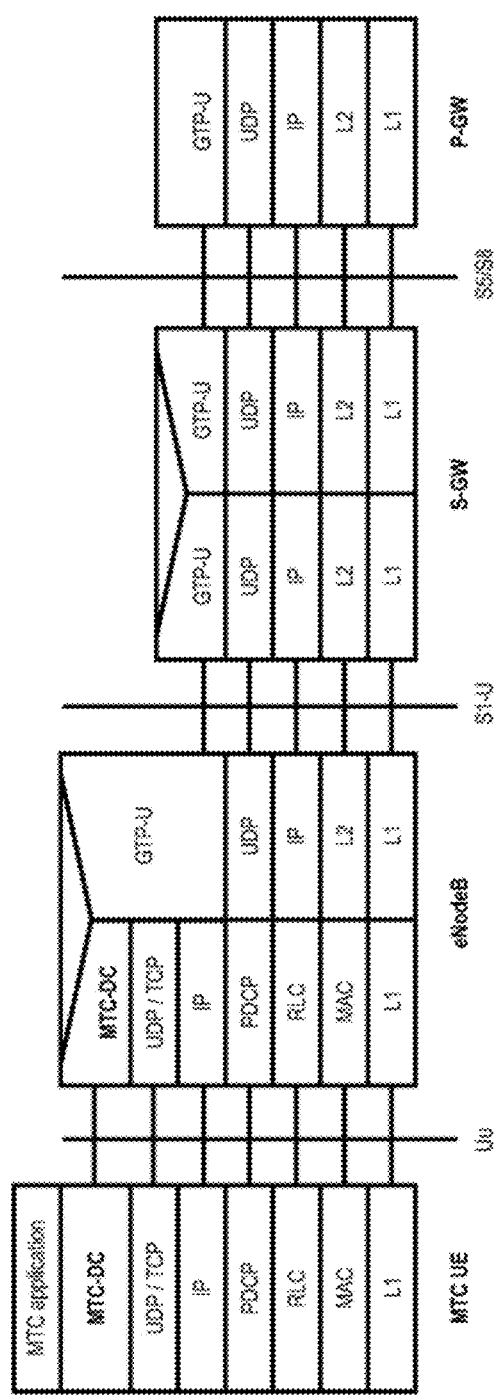
FIG. 12 shows an exemplary user plane stack for Machine type communications architecture according to an embodiment of the invention.

In this disrupted-connectivity mode, the MTC data is not sent in a conventional protocol stack, as for example exemplified for a 3GPP MTC data transmission in FIG. 5, but the protocol stack may be modified as for example shown in FIG. 12, where the protocol stack includes a MTC-DC (MTC-Disrupted Connectivity) layer, which encapsulates the MTC data blocks to be transmitted in with the before mentioned disrupted-connectivity header (MTC-DC header). Notably, the network node (and mobile terminal) terminates the network layer (IP layer), the transport layer and the MTC-DC layer. In this example, it is assumed that the transport layer protocol is UDP, but also other transport layer protocols, such as TCP could be used. Further note that an exemplary structure of the IP packets sent from the mobile terminal to the network node are shown in FIGS. 13 and 14, which will be referenced below as well.

Figure 13:
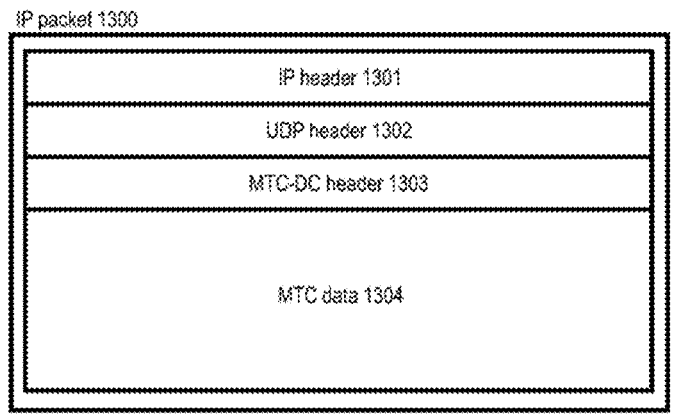
FIGS. 13 & 14 show an IP packet formed and transmitted from a mobile terminal to a network node according to an embodiment of the invention.
Figure 14:
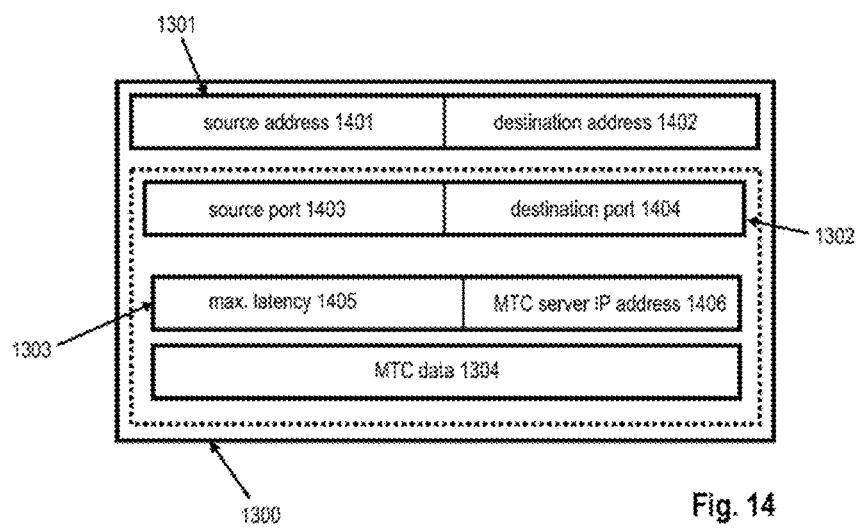

In case a MTC data block 1304 is ready for transmission, the mobile terminal encapsulates 1102 the MTC data block 1304 in a MTC-DC header 1303 (FIG. 13). The MTC-DC header 1303 may for example include QoS requirements for transmitting the MTC data block 1304. In this example, the QoS requirements are indicated by latency information: The MTC-DC header 1303 includes a field 1405 (FIG. 14) which indicated the maximum latency allowed for forwarding the MTC data block 1304.

Furthermore, the MTC-DC header 1303 includes another field 1406, which indicates the IP address of the MTC target device. In this example, it is assumed that the target MTC device is a MTC server, so that field 1406 indicates the IP address of the MTC server. However, it should be understood that field 1406 can also indicate the IP address of any target MTC device outside or inside the mobile communication system, if no MTC server is to be used. In addition and optional, the MTC-DC header 1303 may include a further field for indicating the port number on the target MTC device, to which the IP packet (respectively, the MTC data block 1304) should be delivered. The port number can be assumed to be associated to an application handling the MTC data. The port number can thus identify the target MTC application. The data structure obtained by encapsulating the MTC data block 1304 with the MTC-DC header 1303 is referred to as a data packet.

Next, the mobile terminal adds 1103 an UDP packet header 1302 and an IP packet header 1301 (FIG. 13) to the data packet to thereby obtain an IP packet 1300 for transmission via the access stratum of the mobile communication system to the eNodeB. As shown in FIG. 14 in more detail, the UDP packet header 1302 includes inter alia information such as the source port number 1403 of the mobile terminal and the target port number 1404. The IP packet header 1301 includes inter alia information such as the source IP address 1401 of the mobile terminal and the destination IP address 1402. The destination IP address 1402 may be the IP address of the network node, i.e. the IP address of the eNodeB. Notably, the target port number 1404 may indicate the application handling the disrupted-connectivity mode transmissions of MTC data at the eNodeB. The target port number 1404 may be predefined or may be configured by the network node.

Once the mobile node has formed the IP packet 1300, the IP packet 1300 is transmitted 1104 to the network node. The mobile terminal may further determine 1105, whether there is another MTC data block to be sent, and if so, the mobile terminal goes back to step 1102. If there is no more MTC data to send, the mobile terminal may terminate 1106 the connection to the network node. This may be for example realized by releasing the RRC connection to the eNodeB.

The IP packet 1300 transmitted 1104 by the mobile terminal is received 1107 by the eNodeB. As the eNodeB terminates the IP layer, any IP packet comprising the eNodeB's IP address, such as IP packet 1300, is delivered to the IP layer of eNodeB. For this purpose, eNodeB parses the IP packet header 1301 of the IP packet 1300 and identifies its own IP address in the destination IP address field 1402. Based on this, the eNodeB determines that the IP packet 1300 is addressed to the eNodeB, and the eNodeB further parses the UDP packet header 1402 for the destination port number 1404 to identify the next higher layer (application) to handle the data packet encapsulated in the UDP packet header 1302.

Here, it is assumed that the data packet is delivered to the MTC-DC layer of the eNodeB, where the MTC-DC header 1303 of the data packet is parsed 1108 by the eNodeB to identify the IP address 1406 of the target MTC device. In case the MTC-DC header 1303 includes a (destination) port number, the port number is also read out during parsing the MTC-DC header 1303.

In this embodiment, the MTC data is aggregated at the eNodeB. Accordingly, the eNodeB checks 1109, whether the MTC-DC header 1303 of the parsed data packet (comprised in IP packet 1300) has already been cached at the eNodeB. If this is not the case, i.e. the IP packet 1300 received at 1107 is the first data packet to be delivered to a particular target MTC device or application, the MTC-DC header 1303 is cached 1110 by the eNodeB. After caching the MTC-DC header 1303, or in case the MTC-DC header 1303 was already cached before (i.e. "yes" at step 1109), the eNodeB further caches 1111 the MTC data block 1304 in the data packet and associates 1112 the MTC data block 1304 with the cached MTC-DC header 1303 so as to be able to identify the IP address 1406 (an port number) of the target MTC device for the different cached MTC data blocks for forwarding. Finally, the eNodeB returns to step 1107 to receive the next IP packet from a mobile terminal.

Notably, in order to forward the cached MTC data blocks in an aggregated fashion as discussed in connection with FIGS. 9 and 10 above, once the network load situation allows for forwarding the MTC data blocks, the eNodeB identifies all cached MTC data blocks associated to a particular MTC-DC header 1303. The eNodeB may then generate one or more IP packets which are destined to the IP address 1406 (and port number) of the target MTC device and which include the cached MTC data blocks associated to a particular MTC-DC header 1303, and transmits the generated one or more IP packets towards the target MTC device.

Next, the second aspect of the invention will be discussed in further detail. The second aspect of the invention relates to a signaling procedure between a MTC device (e.g. a mobile terminal) intending to transmit machine type communications data and a network node, which allows the network node to configure a downstream source (e.g. a mobile terminal) to use disrupted-connectivity mode for transmitting machine type communications data. This signaling procedure allows a network node to configure a downstream MTC device to enter disrupted-connectivity mode for example in cases where the network load upon receiving a connection request for the transmission of machine type communications data does not allow for forwarding machine type communications data upstream towards a target device or target machine type communications application. It is also possible to configure a downstream source to enter disrupted-connectivity mode as part of a signaling procedure to reconfigure an already established connection between the downstream source and the network node.

Figure 15:
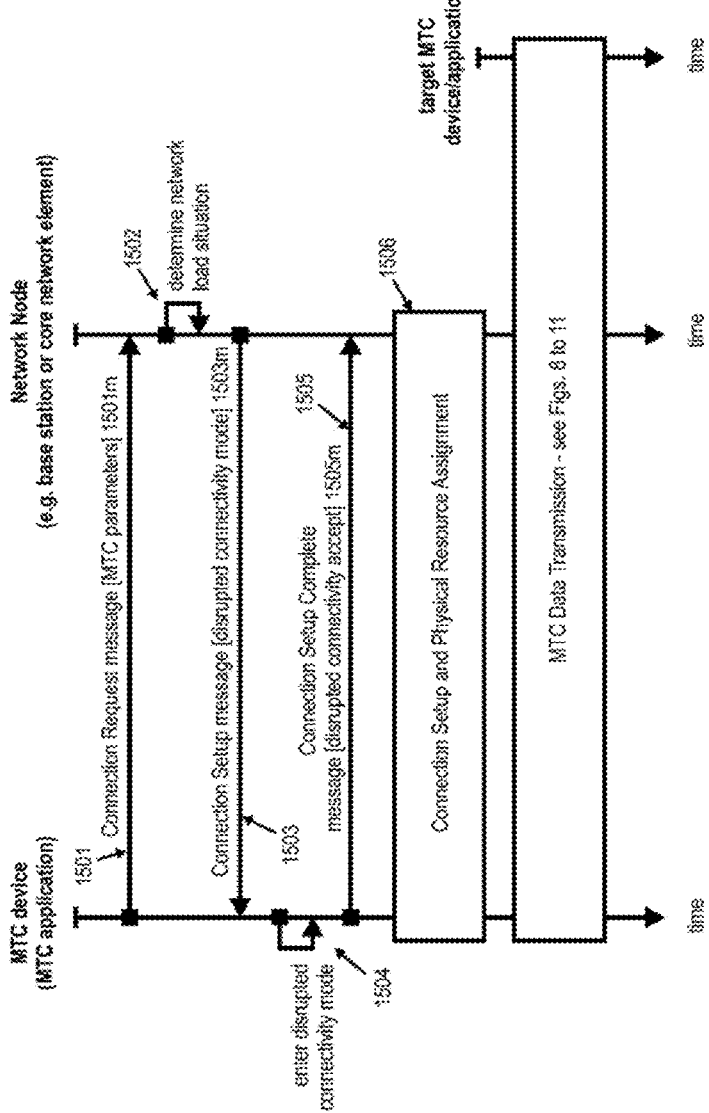
FIG. 15 shows an exemplary flow of messages of a connection establishment procedure between a MTC device and a network according to an embodiment of the invention.

An exemplary flow of messages of a connection setup signaling procedure between the network node and the mobile terminal (MTC device) according to an embodiment of the invention is shown in FIG. 15. This connection setup procedure allows configuring the mobile terminal to transmit MTC data in disrupted-connectivity mode. The network node receives 1501 a connection request message 1501*m* in the control plane from a mobile terminal. The Connection request message 1501*m* requests the establishment of a connection between the network node and the mobile terminal for transmission of MTC data. Furthermore, the connection request message 1501*m* comprises an indication that the requesting mobile terminal is a MTC device, or that the connection is to be established for transmitting MTC data. Optionally, the connection request message 1501*m* may also include a flag (MTC-DC flag) indicating whether the MTC device supports disrupted-connectivity mode or not.

The network node may next determine 1502 the network load status, in order to decide whether or not the MTC device should be configured to use disrupted-connectivity mode for transmitting its MTC data. For this purpose, the network node may further receive at least a part of the load information from an operational support system (OSS) connected to or being part of the mobile communication system (not shown). The network node may for example obtain network-wide load information from OSS or directly from core network nodes to determine the real time load status. Performance monitoring applications in OSS (continuously) monitor the load status of RAN and/or core network nodes and, based on the monitored results, OSS may generate different types of load descriptions for each monitored network node. Hence, in dependence on the load situation of the mobile communication system (e.g. at an overload situation or a critical situation close to the overload situation, such as 80%, 85%, 90%, 95%, or 99% of a maximum load) the network node decides if the MTC device should be configured to use disrupted-connectivity mode for transmitting its MTC data or not. If such overload situation or critical situation exists the network node decides that the MTC device should be configured to use disrupted-connectivity mode for transmitting its MTC data.

Note that if the connection request message 1501*m* includes the MTC-DC flag and the determined 1502 network load situation yields that the MTC device is to be configured in disrupted-connectivity mode, the network node may reject the connection setup request in case the MTC-DC flag indicates that the MTC device does not support disrupted-connectivity mode.

In this example, it is assumed that the determined network load situation yields (critical situation or overload situation) that the MTC device is to be configured in disrupted-connectivity mode and that the MTC device supports disrupted-connectivity mode. The network node sends 1503 a connection setup message 1503m to the MTC device. The connection setup message 1503m includes additional information for informing the MTC device whether it should use disrupted-connectivity mode or not for transmitting the MTC data. This information may be provided in form of a field or flag in the connection setup message 1503m. In FIG. 15, it may be assumed for exemplary purposes that the connection setup message 1503m has a flag which is set to indicate to the MTC device that the MTC device should enter disrupted-connectivity mode (see step 1101 of FIG. 11).

The mobile terminal receives the connection setup message 1503m and recognizes by parsing the flag that it is to enter disrupted-connectivity mode. Accordingly, the MTC device enters 1504 (or switches 1504 from a non-disrupted-connectivity mode to a) disrupted-connectivity mode and indicates this to the network node by sending 1505 a connection setup complete message 1505m to the network node. The setup complete message 1505m may include a field or flag by means of which the MTC device can indicate to the network node that it entered into disrupted-connectivity mode.

The MTC may have the possibility to reject entering into disrupted-connectivity mode. If the MTC device decides to not enter into disrupted-connectivity mode the before-mentioned field or flag of the setup complete message 1505m may be used to indicate this to the network node.

The network node receives the connection setup complete message 1505m from the MTC device. In response to receiving the connection setup complete message 1505m, the network node finishes the connection setup procedure and may further assign physical resources to the MTC device for the transmission of the MTC data. Note that the transmission of the MTC data may then be performed as outlined in connection with the first aspect of the invention, e.g. as outlined in connection with FIGS. 8 to 11 before.

In one exemplary embodiment, the signaling procedure explained in connection with FIG. 15 above can be implemented as a (modified) RRC connection establishment procedure defined in section 5.3.3 of 3GPP TS 36.331, "Radio Resource Control (RRC); Protocol specification", version 11.5, which is incorporated herein by reference, and the relevant RRC message structures are shown in section 6.2.2.

Figure 16:
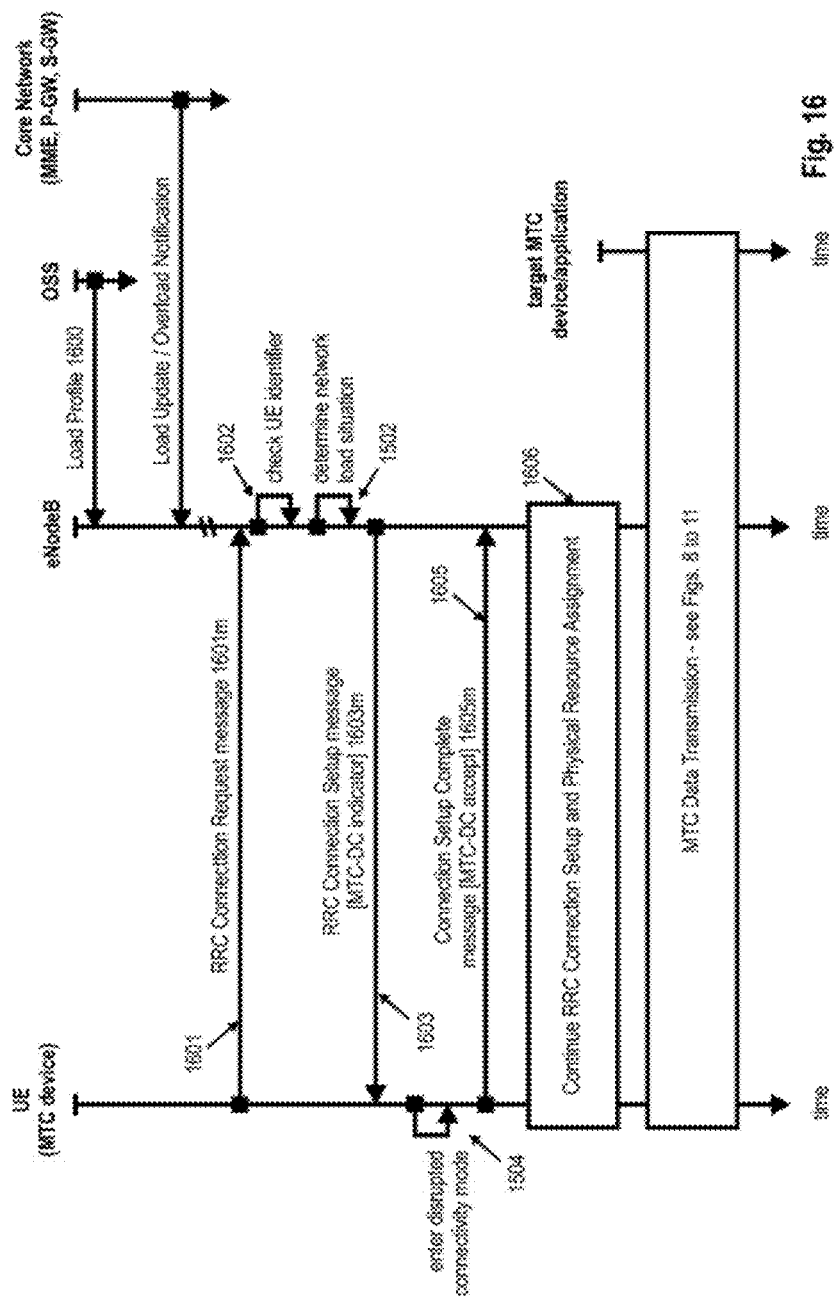
FIG. 16 shows an exemplary flow of messages of a modified 3GPP RRC connection establishment procedure between a UE (MTC device) and an eNodeB according to an embodiment of the invention.

FIG. 16 shows an exemplary flow of messages of such modified 3GPP RRC connection establishment procedure between a UE (MTC device or mobile terminal) and an eNodeB according to an embodiment of the invention. For simplicity, the following mainly focuses on discussing the modifications to procedures and the messages exchanged during the RRC connection establishment as known from 3GPP TS 36.331.

The RRC connection request message 1601m is sent 1601 by the MTC device to the eNodeB. The RRC connection request message indicates to the eNodeB that the requesting UE (the MTC device) requests a connection for MTC data. This indication may be provided in different fashions. For example, in one implementation a UE identifier (e.g. S-TMSI) comprised in the RRC connection request message may allow the eNodeB to recognize the UE to be a MTC device. Optionally, the RRC connection request message may also include a flag indicating whether the MTC device supports disrupted-connectivity mode or not (not shown in FIG. 16).

Upon reception of the RRC connection request message the eNodeB checks 1602 the UE identifier in the message 1601m and if it corresponds to the UE identifier of a MTC device, the eNodeB will perform the modified RRC connection establishment procedure as discussed herein below. Otherwise, the eNodeB may perform a conventional RRC procedure as known from 3GPP TS 36.331.

Furthermore, the eNodeB determines 1502 the load status in order to decide, whether the UE requesting the establishment of an RRC connection for transmitting MTC data should be configured in disrupted-connectivity mode or not. The load status may be for example the load status on the transmission path of the MTC data towards the target MTC device. In one example, the load status may only consider the load on the link towards the next-hop node in the transmission path. In another example, the load status may only consider the load on all links towards the MTC server in the transmission path (e.g. eNodeB→S-GW→P-GW→MTC Server), or alternatively, on only a subset of the links. The load situation may be determined based on a network load profile 1600, e.g. a load profile of RAN and/or core network, and/or a real time load status. For this purpose the network node may optionally obtain network-wide load information from an OSS or directly from core network nodes to determine the real time load status. Performance monitoring applications in OSS (continuously) monitor the load status of RAN and/or core network nodes and, based on the monitored results, OSS may generate different types of load descriptions for each monitored network node.

If the load status determined 1502 by the eNodeB indicates that the network load does presently not allow for forwarding the MTC data, the eNodeB decides to configure the requesting UE in disrupted-connectivity mode for the transmission of MTC data. Whether or not the network load allows for forwarding the MTC data may be for example determined by the eNodeB by comparing the present network load with predetermined or configurable threshold value indicating a maximum tolerable load (in general or for MTC data). Otherwise, if the network load status is not critical, the eNodeB may continue with a conventional RRC procedure as known from 3GPP TS 36.331. If the UE has indicated by means of a flag in the RRC connection request message 1601m that it does not support disrupted-connectivity mode, but the network status would require disrupted-connectivity mode, the eNodeB may reject the RRC connection request with a RRC Rejection message or alternatively, the eNodeB may use mechanism such as outlined in the parallel pending PCT application with the title "Controlling Data Transmissions for Machine Type Communications in a Mobile Communication System" of the same applicant.

In FIG. 16, the load status determined 1502 by the eNodeB indicates that the network load does presently not allow for forwarding the MTC data so that the eNodeB decides to configure the requesting UE in disrupted-connectivity mode for the transmission of MTC data. Accordingly, the eNodeB sends 1603 an RRC connection setup message 1603m (which is comparable to the connection setup message 1503m) to the UE. The RRC connection setup message 1603m has similar data structure with normal RRC Connection Setup/Rejection message. A difference is that it includes additional information on whether the UE should enter disrupted-connectivity mode or not. This information may be for example referred to as a MTC-DC indicator. In one exemplary implementation, the RRC connection setup message 1603m could look like the message defined by the following ASN.1 syntax.

```
RRCConnectionSetup ::=           SEQUENCE {
    rrc-TransactionIdentifier    RRC-TransactionIdentifier,
    criticalExtensions           CHOICE {
        c1                           CHOICE {
            rrcConnectionSetup-r8        RRCConnectionSetup-r8-IEs,
            spare7 NULL,
            spare6 NULL, spare5 NULL, spare4 NULL,
            spare3 NULL, spare2 NULL, spare1 NULL
        },
        criticalExtensionsFuture     criticalExtensionsFuture-IEs
    }
}
RRCConnectionSetup-r8-IEs ::=    SEQUENCE {
    radioResourceConfigDedicated     RadioResourceConfigDedicated,
    nonCriticalExtension             RRCConnectionSetup-v8a0-IEs OPTIONAL
}
RRCConnectionSetup-v8a0-IEs ::=  SEQUENCE {
    lateNonCriticalExtension         OCTET STRING       OPTIONAL, -- Need OP
    nonCriticalExtension             SEQUENCE { }       OPTIONAL -- Need OP
}
criticalExtensionsFuture-IEs ::= SEQUENCE {
    mtcDCFlag                        BOOLEAN            OPTIONAL
}
```

Upon reception of the RRC connection setup message 1603m, the UE enters 1504 disrupted-connectivity mode and sends 1605 a RRC connection setup complete message 1605m. This RRC connection setup complete message 1605m (which can be compared to the connection setup complete message 1505m) may be optionally enhanced by comprising an information (MTC-DC accept) field for indicating that the UE has entered into disrupted-connectivity mode. Optionally, if the UE can reject entering into disrupted-connectivity mode, this field could be also used to indicate to the eNodeB whether or not the UE has entered into disrupted-connectivity mode.

If the UE has entered disrupted-connectivity mode, the eNodeB continues 1606 and finishes the RRC procedure as known from 3GPP TS 36.331 and may further assign physical resources to the UE for transmitting the MTC data. The transmission of the MTC data may then be performed by the UE as outlined in connection with FIGS. 8 to 11 above.

Figure 17:
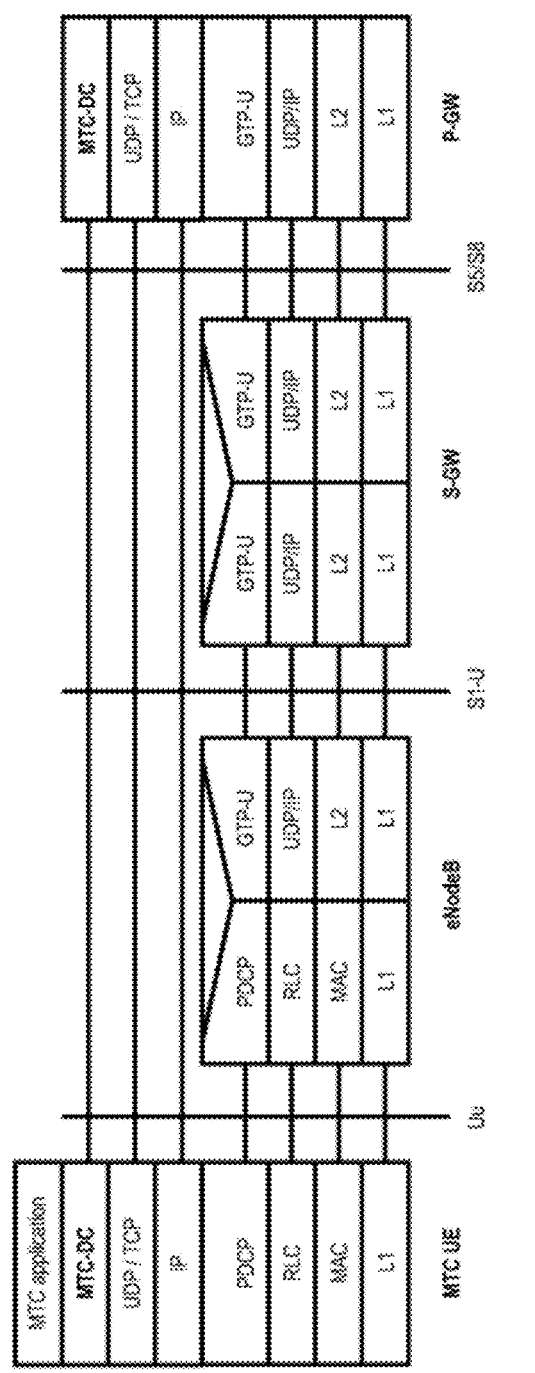
FIG. 17 shows an exemplary user plane stack for Machine type communications architecture according to another embodiment of the invention.

As noted in the previous example, the network node may be for example implemented as a base station (or eNodeB) for use in the radio access network of the mobile communication system. Another possibility is to implement the functionality of the network node in the P-GW of the core network. The protocol stack for such option is shown in FIG. 17 to highlight the respective termination points of the IP layer, transport layer and MTC-DC. Otherwise, the functionality of the MTC device and the P-GW corresponds to that of the MTC device and eNodeB described in connection with FIG. 12 above. However, the network node is not limited to these examples.

In some of the embodiments discussed above, in case the (network) load of the eNodeB (or any other nodes in the access networks) is above pre-defined thresholds, the eNodeB could reject RRC connection requests from UEs. In alternative embodiment, in this situation, the eNodeB may also use a mechanism such as outlined in the above mentioned parallel pending PCT application with the title "Controlling Data Transmissions for Machine Type Communications in a Mobile Communication System" of the same applicant in order to instruct a requesting UE to reconnect (e.g. send another RRC connection request) at a later point in time. For this purpose the eNodeB could offer the UE one or more timeslots in its RRC connection setup message 1603m, wherein the timeslots indicate points in time, where the UE can reconnect to the network for transmitting the MTC data. In such scenarios, the eNodeB may thus determine timeslots for the UE for reconnecting to the RAN by combining MTC connection requirements with its own load status. After receiving the suggested timeslots, the UE may cache the MTC data locally, aggregate the MTC data (of the same MTC application or to the same MTC application servers) and re-transmit the connection request in one of the suggested timeslots. If the new connection request is accepted by the eNodeB, the aggregated data block is sent by the UE in a single MTC connection to the MTC server.

In another embodiment, in presence of congested radio access networks, it is also possible that UEs (MTC devices) transmit their MTC data to other nodes in the network (network nodes such as home gateways or other neighboring UEs that can be reached via peer-to-peer connections, for example, Bluetooth or WLAN connections). Such other nodes or UEs may aggregate MTC data from one or multiple UEs (MTC devices) which belong to the same MTC application, similar to the buffering of MTC data by network node described in connection with FIGS. 8 to 10. The buffering node or UE can then send all MTC data from the different UEs in one batch to the base station, when the base station is relieved from congestions.

Furthermore, in case a network node in the transmission path of the MTC data is congested or overloaded, the network node could propagate its critical load situation downstream towards the MTC device(s) sending the MTC data. After receiving a congestion/overload notification from the network node, a downstream node in the transmission path may switch the connectivity mode from normal mode (non-disrupted connectivity mode) to disrupted-connectivity mode, and may aggregate the MTC data. For example, if the P-GW is overloaded, the eNodeB could encapsulate the MTC data to be sent with the disrupted-connectivity header and transmit the data packet to the S-GW. The S-GW caches, aggregates and forwards the MTC data from multiple data sending nodes in a single connection, when the congestion at the S-GW is no longer present. Of course, this option is also feasible for other combinations of downstream nodes other than eNodeB and S-GW. More generically, if a node C is congested or overloaded, downstream node B (which is upstream in the transmission path of data sending nodes A but downstream from node C) may cache, aggregate and forward the MTC data from multiple data sending A nodes in a single connection to node C (after C is relieved from congestions or overloaded situations). Such node B would be adapted to perform the functionality of the network node in FIGS. 8 to 10.

Further optionally, node B does not necessarily have to be part of the (normal) transmission path of the MTC data, but could be also a designated node B to perform the functionality of the network node in FIGS. 8 to 10 outlined above.

Figure 18:
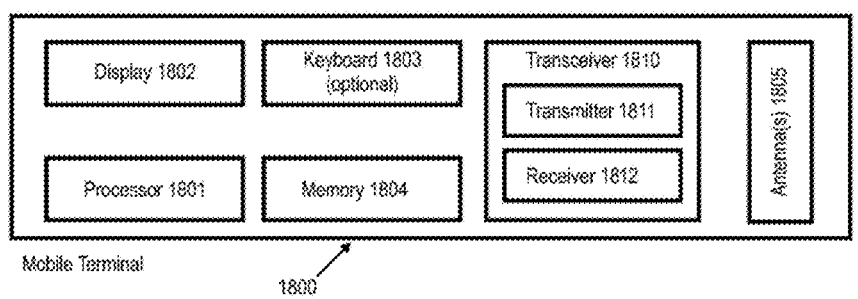
FIG. 18 shows a mobile terminal (MTC device) according to an exemplary embodiment.

A further embodiment provides a mobile terminal 1800 as exemplarily shown in FIG. 18. This mobile terminal comprises a transceiver 1810, which has a transmitter 1811 and a receiver 1812. The transmitter 1811 is configured to transmit, in the control plane, a connection request message to a network node in the radio access network or in the core network of a mobile communication system. The connection request message requests the establishment of a connection and indicates that the requesting mobile terminal is a MTC device. The receiver 1812 is configured to receive, in the control plane and from the network node, a connection setup message. The connection setup message informs the mobile terminal whether or not it is to enter disrupted-connectivity mode for transmission of the MTC data.

The transmitter 1811 is further configured to transmit, in response to the connection setup message and in the control plane, a connection setup complete message to the network node indicating that the mobile terminal has entered into disrupted-connectivity mode, which may be considered also an acknowledgement of the respective indication in the connection setup message.

The mobile terminal 1800 further comprises a processor 1801 which controls the mobile terminal switching from a non-disrupted-connectivity mode to a disrupted-connectivity mode. The processor 1801 is further configured to form one or more data packets. Each data packet comprises machine type communication data and a disrupted-connectivity header. The disrupted-connectivity header indicates the maximum tolerable delay for forwarding the machine type communications data and an address of the respective target device to receive the respective machine type communications data. Furthermore, the transmitter 1811 may be further adapted to transmit the formed data packets.

Furthermore, the processor 1801 may control the display of information on an (optional) display 1802 of the mobile terminal and may process inputs that may be received via an (optional) keyboard 1803. The mobile terminal may also have one or more antennas 1805 for transmitting user plane and control plane data to a network node, such as a base station, as discussed herein.

Figure 19:
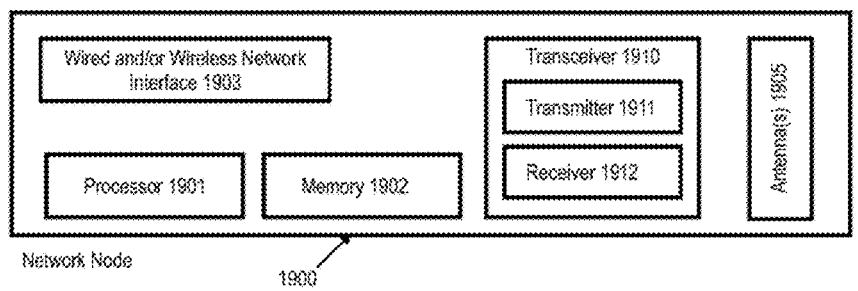
FIG. 19 shows a network node (e.g. base station, mobility management unit, etc.) according to an exemplary embodiment.

Another embodiment relates to a network node 1900 as exemplarily shown in FIG. 19 for transmitting machine type communication data from at least one machine type communications device within a mobile communication system with disrupted connectivity. The network node 1900 may be a network node for use in the radio access network or for use in the core network of the mobile communication system.

The network node comprises a transceiver 1910, which has a transmitter 1911 and a receiver 1912. The receiver 1912 is configured to receive one or more data packets, each data packet comprising machine type communications data and a disrupted-connectivity header, wherein the disrupted-connectivity header indicates a maximum tolerable delay for forwarding the machine type communications data and an address of a target device to receive the respective machine type communications data. The network node 1900 may further comprise a processor 1901 for determining a load status of the mobile communication system. The transmitter 1911 is adapted to forward the machine type communications data to the respective target device within the maximum tolerable delay indicated in the disrupted-connectivity header, if the load status indicates no overload situation and if the maximum delay for a respective machine type communications data has not been reached.

The processor 1901 may further be capable of storing the machine type communications data comprised in the one or more data packets in memory 1902, while the determined load status indicates an overload situation. The processor 1901 may aggregate the machine type communications data comprised in data packets received during an overload situation and being destined to the same target device or being destined to the same target machine type communications application running on the same target device. The transmitter 1911 may be capable of forwarding the machine type communications data to the target device via a single connection.

The receiver 1901 may be configured to receive a connection request message in the control plane from a mobile terminal (such as the mobile terminal 1800), wherein the connection request message requests the establishment of a connection between the network node 1900 and the mobile terminal, and indicates that the requesting mobile terminal is a MTC device. The processor 1901 may be configured to determine the load status of the network node and/or of network nodes upstream the network node and to decide, whether the mobile terminal requesting the connection for transmitting MTC data should use disrupted connectivity or not. Further, the transmitter 1911 may be configured to transmit, in the control plane and to a mobile terminal, a connection setup message, wherein the first connection setup message informs the mobile terminal on whether to use disrupted-connectivity mode for transmitting the MTC data.

The processor 1901 is configured to execute any functionality that requires computation and determination, such as the determination of load status, the parsing of messages, aggregation of data packets (MTC data) including associating MTC-DC headers and their corresponding MTC data blocks, etc. The network node may also comprise the memory 1902 to permanently or temporarily store information, such as the MTC data, the MTC-DC headers, load information, etc. Furthermore, the network node may also comprise a wired interface and/or wireless interface that allows for connecting to other network nodes in the mobile communication system, e.g. OSS.

Optionally the network node 1900 may also have one or more antennas 1905 for transmitting and receiving data via the air.

Furthermore, the network node 1900 may be implemented as a base station for use in the radio access network of the mobile communication system, or alternatively as a packet data network gateway for use in the core network of the mobile communication system. However, the network node is not limited to these two examples.

It should be noted that the basic mechanism proposed herein can also be used for non-MTC devices which allow delay tolerant connectivity. For example, some applications running inside smart phones may initiate machine-to-machine type communication (such as a social media content app pushing non-real-time updates towards social media content servers).

Moreover, the basic mechanism proposed herein may also be used in fixed networks where terminals and applications allow delay tolerant connectivity.

It should be further noted that the individual features of the different embodiments of the aspects discussed herein may individually or in arbitrary combination be subject matter to another invention.

Although some aspects have been described in the context of a method, it is clear that these aspects also represent a description of the corresponding apparatus suitably adapted to perform such method. In such apparatus a (functional or tangible) block or device may correspond to one or more method step or a feature of a method step. Analogously, aspects described in the context of a corresponding block or item or feature of a corresponding apparatus may also correspond to individual method steps of a corresponding method.

Furthermore, the methods described herein may also be executed by (or using) a hardware apparatus, like a processor, microprocessor, a programmable computer or an electronic circuit. Some one or more of the most important method steps may be executed by such an apparatus. Where an apparatus has been described herein in terms of functional elements, e.g. processing unit, receiving unit, transmitter unit, or the like, it should be further understood that those elements of the apparatus may be fully or partly implemented in hardware elements/circuitry. Individual hardware, like a processor or microprocessor, a transmitter circuitry, receiver circuitry, etc., may be used to implement the functionality of one or more elements of the apparatus.

In addition, where information or data is to be stored in the process of implementing a method step of functional element of an apparatus in hardware, the apparatus may comprise memory or storage medium, which may be communicatably coupled to one or more hardware elements/circuitry of the apparatus.

It is also contemplated implementing the aspects of the invention in in hardware or in software or a combination thereof. This may be using a digital storage medium, for example a floppy disk, a DVD, a Blu-Ray, a CD, a ROM, a PROM, an EPROM, an EEPROM or a FLASH memory, having electronically readable control signals or instructions stored thereon, which cooperate (or are capable of cooperating) with a programmable computer system such that the respective method is performed. A data carrier may be provided which has electronically readable control signals or instructions, which are capable of cooperating with a programmable computer system, such that the method described herein is performed.

It is also contemplated implementing the aspects of the invention in the form of a computer program product with a program code, the program code being operative for performing the method when the computer program product runs on a computer. The program code may be stored on a machine readable carrier.

The above described is merely illustrative, and it is understood that modifications and variations of the arrangements and the details described herein will be apparent to others skilled in the art. It is the intent, therefore, to be limited only by the scope of the impending claims and not by the specific details presented by way of description and explanation above.

The invention claimed is:

1. A method for transmitting machine type communication data from at least one machine type communications device within a mobile communication system with disrupted connectivity, the method, which is performed by a network node in a radio access network or in a core network of the mobile communication system, comprising:
    receiving one or more data packets, each data packet comprising machine type communications data and a disrupted-connectivity header, wherein the disrupted-connectivity header indicates a maximum tolerable delay for forwarding the machine type communications data and an address of a target device to receive the machine type communications data,
    determining a load status of the mobile communication system, and
    in response to the load status indicating no overload and the maximum delay for machine type communications data not being reached, forwarding the machine type communications data to the target device within the maximum tolerable delay indicated in the disrupted-connectivity header.

2. The method according to claim 1, further comprising the storing the machine type communications data comprised in the one or more data packets, while the determined load status indicates an overload.

3. The method according to claim 2, further comprising aggregating the machine type communications data comprised in data packets received during the overload and being addressed to the target device or being addressed to a target machine type communications application running on the target device,
    wherein the forwarding of the machine type communications data to the target device comprises forwarding the aggregated machine type communications data via a single connection.

4. The method according to claim 3, wherein the machine type communications data, which are aggregated for forwarding via the single connection, are received in data packets from different source machine type communications applications running on the same source device or on different source devices.

5. The method according to claim 2, wherein for different data packets with the same disrupted-connectivity header, the disrupted-connectivity header is stored once and the once stored disrupted-connectivity header is associated with the stored machine type communications data from the different data packets with the same disrupted-connectivity header.

6. The method according to claim 2, wherein the network node is configured to discard stored machine type communications data and a disrupted-connectivity header associated with the stored machine type communications data, whenever the machine type data communications cannot be forwarded within the maximum tolerable delay indicated in the associated disrupted-connectivity header due to an overload indicated in the load status.

7. The method according to claim 1, wherein the disrupted-connectivity header comprises a port number associated to a target machine type communications application running on the target device to receive the machine type communications data.

8. The method according to claim 1, wherein the data packets are internet protocol (IP) packets further comprising a header indicating the IP address of the network node.

9. The method according to claim 1, further comprising:
    receiving a connection request message in the control plane from a mobile terminal, wherein the connection request message requests the establishment of a connection between the network node and the mobile terminal, and indicates that the requesting mobile terminal is a machine type communication device;
in dependence on the load status of the mobile communication system, transmitting, in the control plane and to the mobile terminal, a connection setup message, wherein the connection setup message informs the mobile terminal that the machine type communications data can only be transmitted in a disrupted-connectivity mode,
receiving, in response to the connection setup message and in the control plane, a connection setup complete message from the mobile terminal confirming the use of the disrupted-connectivity mode for transmission of the machine type communications data, and
establishing the requested connection to the mobile terminal for transmission of the machine type communications data in disrupted-connectivity mode; and
wherein at least a part of the received one or more data packets were transmitted from the mobile terminal to the network node.

10. A method for transmitting machine type communication data in a mobile communication system with disrupted connectivity, the method, performed by a network component, comprising:
switching from a non-disrupted-connectivity mode to a disrupted-connectivity mode;
in the disrupted-connectivity mode, forming one or more data packets, each data packet comprising machine type communication data and a disrupted-connectivity header, wherein the disrupted-connectivity header indicates the maximum tolerable delay for forwarding the machine type communications data and an address of a target device to receive the machine type communications data; and
in the disrupted-connectivity mode, transmitting the one or more data packets to a network node, which is configured to transmit the one or more data packets to the target device within the maximum tolerable delay indicated in the disrupted-connectivity header.

11. The method according to claim 10, further comprising:
transmitting a connection request message in the control plane to the network node, wherein the connection request message requests the establishment of a connection between the network component and the network node, and indicates that the data to be sent is machine type communications data;
receiving, in the control plane and from the network node, a connection setup message, wherein the connection setup message informs the network component that the machine type communications data can only be transmitted in the disrupted-connectivity mode;
transmitting, in response to the connection setup message and in the control plane, a connection setup complete message to the network node to confirm the use of the disrupted-connectivity mode for transmission of the machine type communications data; and
establishing the requested connection to the network node for transmission of the machine type communications data in the disrupted-connectivity mode;
wherein the switching from the non-disrupted-connectivity mode to the disrupted-connectivity mode is performed in response to the reception of said connection setup message.

12. The method according to claim 10, wherein the data packets are internet protocol (IP) packets and the method further comprises:
in the disrupted-connectivity mode, adding a header to each IP packet, the header indicating an IP address of the network node.

13. A network node for transmitting machine type communication data from at least one machine type communications device within a mobile communication system with disrupted connectivity, the network node comprising:
a receiver configured to receive one or more data packets, each data packet comprising machine type communications data and a disrupted-connectivity header, wherein the disrupted-connectivity header indicates a maximum tolerable delay for forwarding the machine type communications data and an address of a target device to receive the machine type communications data,
a processor configured to determine a load status of the mobile communication system, and
a transmitter configured to forward the machine type communications data to the target device within the maximum tolerable delay indicated in the disrupted-connectivity header, in response to the load status indicating no overload and the maximum tolerable delay indicated in the disrupted-connectivity header for the machine type communications data not being reached.

14. A network component for transmitting machine type communication data in a mobile communication system with disrupted connectivity, the network component comprising:
a packet processor configured to form, in a disrupted-connectivity mode, one or more data packets, each data packet comprising machine type communication data and a disrupted-connectivity header, wherein the disrupted-connectivity header indicates a maximum tolerable delay for forwarding the machine type communications data and an address of a target device to receive the machine type communications data; and
a transmitter configured to transmit the one or more data packets to a network node, which is configured to transmit the one or more data packets to the target device within the maximum tolerable delay indicated in the disrupted-connectivity header.

15. A non-transitory computer readable storage medium, comprising computer program instructions, which when executed by one or more processors of a computer cause the computer to implement:
receiving one or more data packets, each data packet comprising machine type communications data and a disrupted-connectivity header, wherein the disrupted-connectivity header indicates a maximum tolerable delay for forwarding the machine type communications data and an address of a target device to receive the machine type communications data,
determining a load status of the mobile communication system, and
in response to the load status indicating no overload and the maximum delay for a machine type communications data not being reached, forwarding the machine type communications data to the target device within the maximum tolerable delay indicated in the disrupted-connectivity header.

16. The non-transitory computer readable storage medium according to claim 15, further comprising computer program instructions, which when executed by the one or more processors of the computer cause the computer to implement:

storing the machine type communications data comprised in the one or more data packets, while the determined load status indicates an overload.

17. The non-transitory computer readable storage medium according to claim 16, further comprising computer program instructions, which when executed by the one or more processors of the computer cause the computer to implement:

aggregating the machine type communications data comprised in data packets received during the overload and being addressed to the target device or being addressed to a target machine type communications application running on the target device, wherein the forwarding of the machine type communications data to the target device comprises forwarding the aggregated machine type communications data via a single connection.

18. A non-transitory computer readable storage medium, comprising computer program instructions, which when executed by one or more processors of a computer cause the computer to implement:

switching from a non-disrupted-connectivity mode to a disrupted-connectivity mode;

in the disrupted-connectivity mode, forming one or more data packets, each data packet comprising machine type communication data and a disrupted-connectivity header, wherein the disrupted-connectivity header indicates a maximum tolerable delay for forwarding the machine type communications data and an address of a target device to receive the machine type communications data; and in the disrupted-connectivity mode, transmitting the one or more data packets to a network node, which is configured to transmit the one or more data packets to the target device within the maximum tolerable delay indicated in the disrupted-connectivity header.

19. The non-transitory computer readable storage medium according to claim 18, further comprising computer program instructions, which when executed by the one or more processors of the computer cause the computer to implement:

transmitting a connection request message in the control plane to the network node, wherein the connection request message requests the establishment of a connection between the network component and the network node, and indicates that the data to be sent is machine type communications data;

receiving, in the control plane and from the network node, a connection setup message, wherein the connection setup message informs the network component that the machine type communications data can only be transmitted in a disrupted-connectivity mode;

transmitting, in response to the connection setup message and in the control plane, a connection setup complete message to the network node to confirm the use of the disrupted-connectivity mode for transmission of the machine type communications data; and establishing the requested connection to the network node for transmission of the machine type communications data in the disrupted-connectivity mode;

wherein the switching from the non-disrupted-connectivity mode to the disrupted-connectivity mode is performed in response to the reception of said connection setup message.

20. The non-transitory computer readable storage medium according to claim 18, wherein the data packets are internet protocol (IP) and the non-volatile computer readable storage medium further comprises computer program instructions, which when executed by the one or more processors of the computer cause the computer to implement:

in the disrupted-connectivity mode, adding a header to each IP packet, the header indicating an IP address of the network node.

\* \* \* \* \*